United States Patent [19]

Hamada et al.

[11] Patent Number: 5,143,270

[45] Date of Patent: Sep. 1, 1992

[54] SYSTEM FOR ASSEMBLING MOTORCAR VEHICLE BODY

[75] Inventors: Akio Hamada; Keizaburo Ohtaki; Takashi Kubo; Hiroshi Sasamoto, all of Sayama, Japan

[73] Assignee: Honda Giken Kogyo Kabushiki Kaisha, Tokyo, Japan

[21] Appl. No.: 788,695

[22] Filed: Nov. 6, 1991

[30] Foreign Application Priority Data

Nov. 28, 1990 [JP] Japan .................................. 2-326464
Nov. 28, 1990 [JP] Japan .................................. 2-326465
Nov. 28, 1990 [JP] Japan .................................. 2-326467

[51] Int. Cl.$^5$ ............................................. B23K 37/04
[52] U.S. Cl. .................................. 228/4.1; 228/49.1; 29/793; 29/430
[58] Field of Search ..................... 228/4.1, 6.1, 18, 47, 228/49.1; 219/79; 29/430, 793, 794

[56] References Cited

U.S. PATENT DOCUMENTS

| 4,659,895 | 4/1987 | Di Rosa | 228/4.1 |
| 4,667,866 | 5/1987 | Tobita et al. | 228/49.1 |
| 4,767,046 | 8/1988 | Kumagai et al. | 228/49.1 |
| 4,856,698 | 8/1989 | Marianne et al. | 228/4.1 |

FOREIGN PATENT DOCUMENTS 58-28742 6/1983 Japan .

*Primary Examiner*—Samuel M. Heinrich
*Attorney, Agent, or Firm*—Armstrong, Nikaido, Marmelstein, Kubovcik & Murray

[57] ABSTRACT

A system for assembling a motorcar vehicle body is divided into a first-floor portion and a second-floor portion. The first-floor portion has a main working line provided with a vehicle body assembling station, a floor panel assembling line, and a floor panel parts working line. The second-floor portion has another floor panel parts working line and a roof panel working line. There are provided apparatuses for charging floor panel consitituting parts worked in the floor panel parts working line disposed on the first-floor portion to a floor panel assembling line, and for lowering floor panel constituting parts worked in the floor panel parts working line disposed on the second-floor portion from the second-floor portion to charge them to the floor panel assembling line so that these constituting parts are combined together in the floor panel assembling line to assemble the floor panel. There are also provided apparatuses for charging the floor panel to the vehicle body assembling station, and for lowering the roof panel worked in the roof panel working line form the second-floor portion to a neighborhood of the vehicle body assembling station and charging it to the vehicle body assembling station so that the side panels which are set to welding jigs are combined in the vehicle body assembling station to the floor panel and the roof panel to assemble the motor car vehicle body.

8 Claims, 22 Drawing Sheets

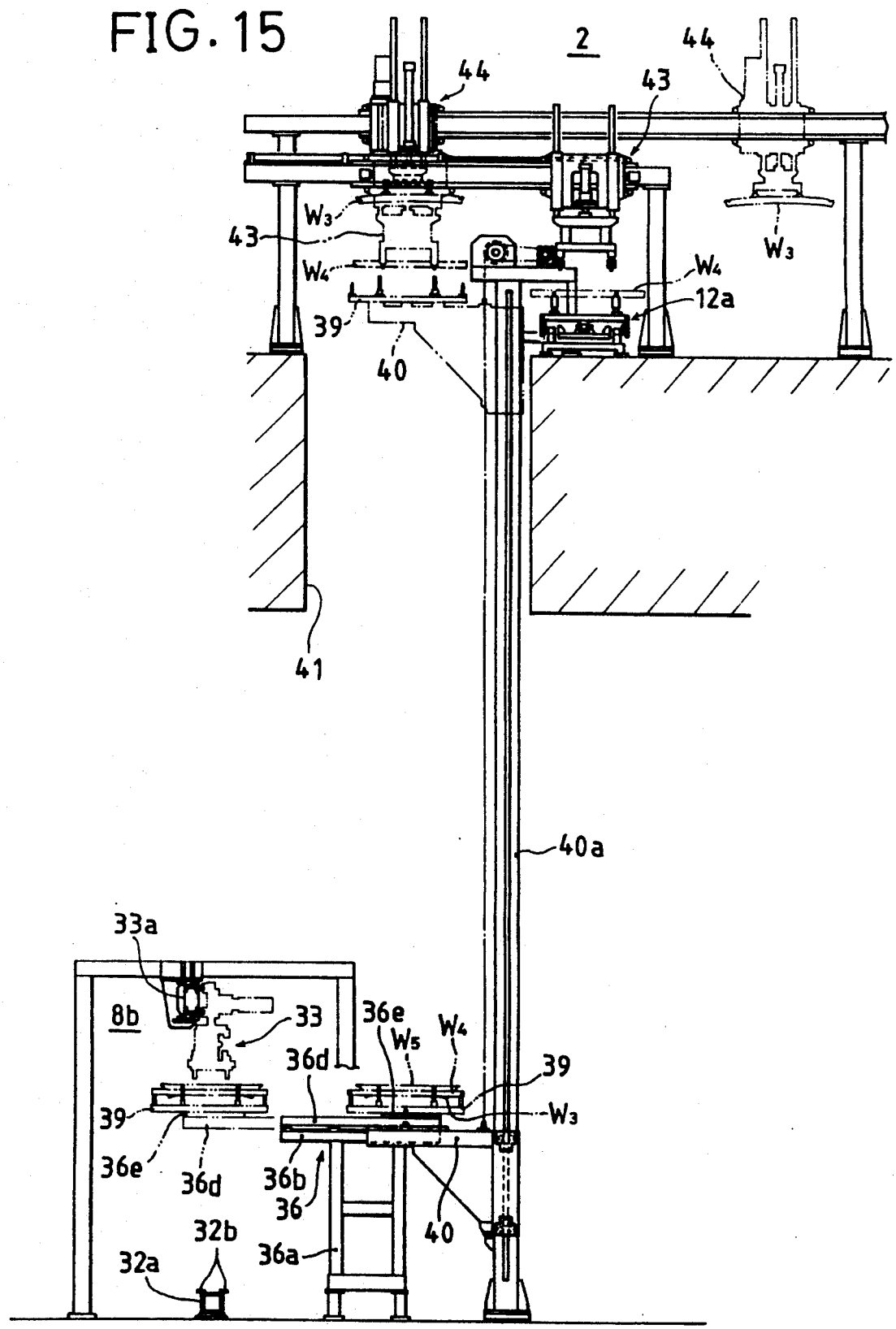

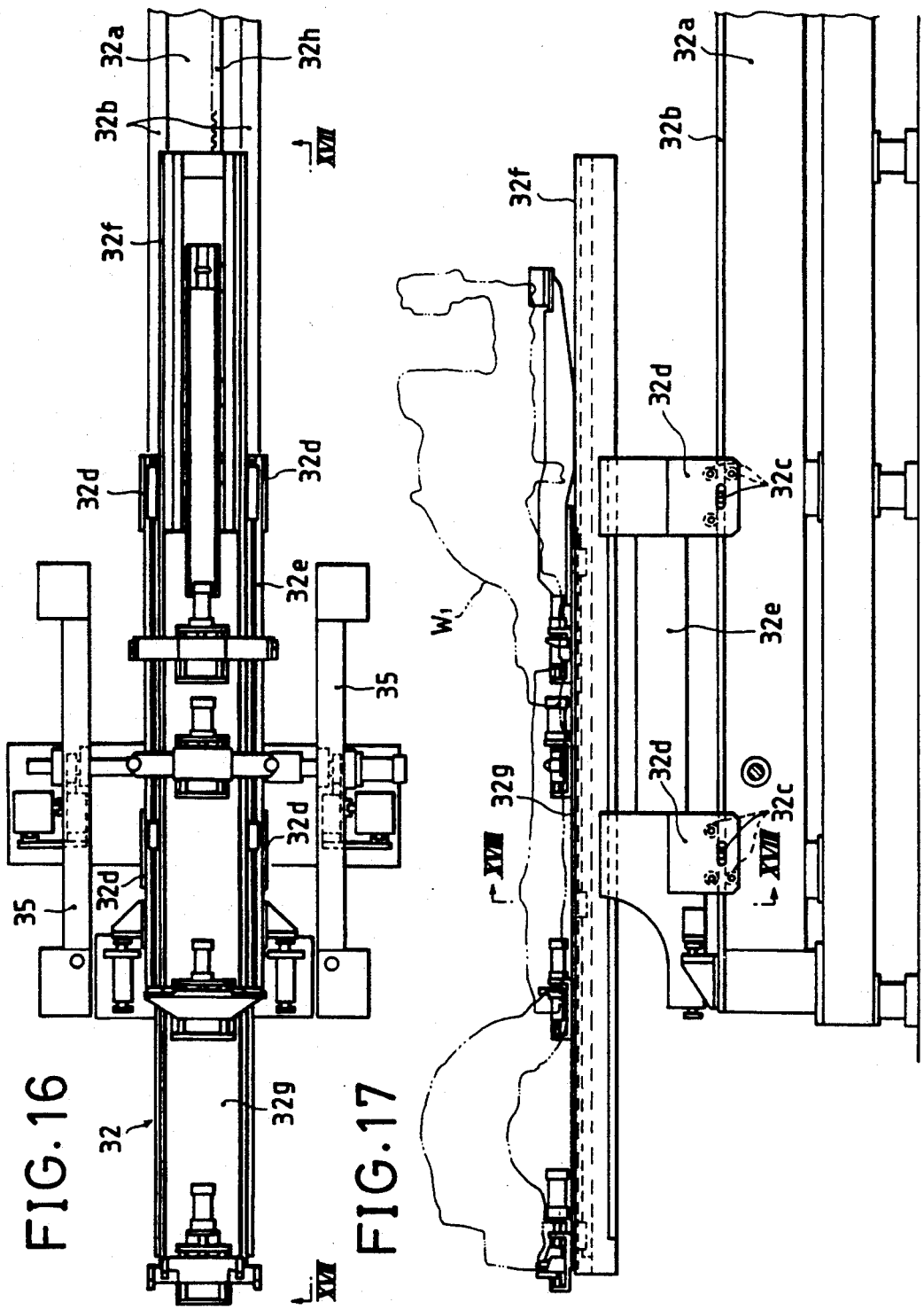

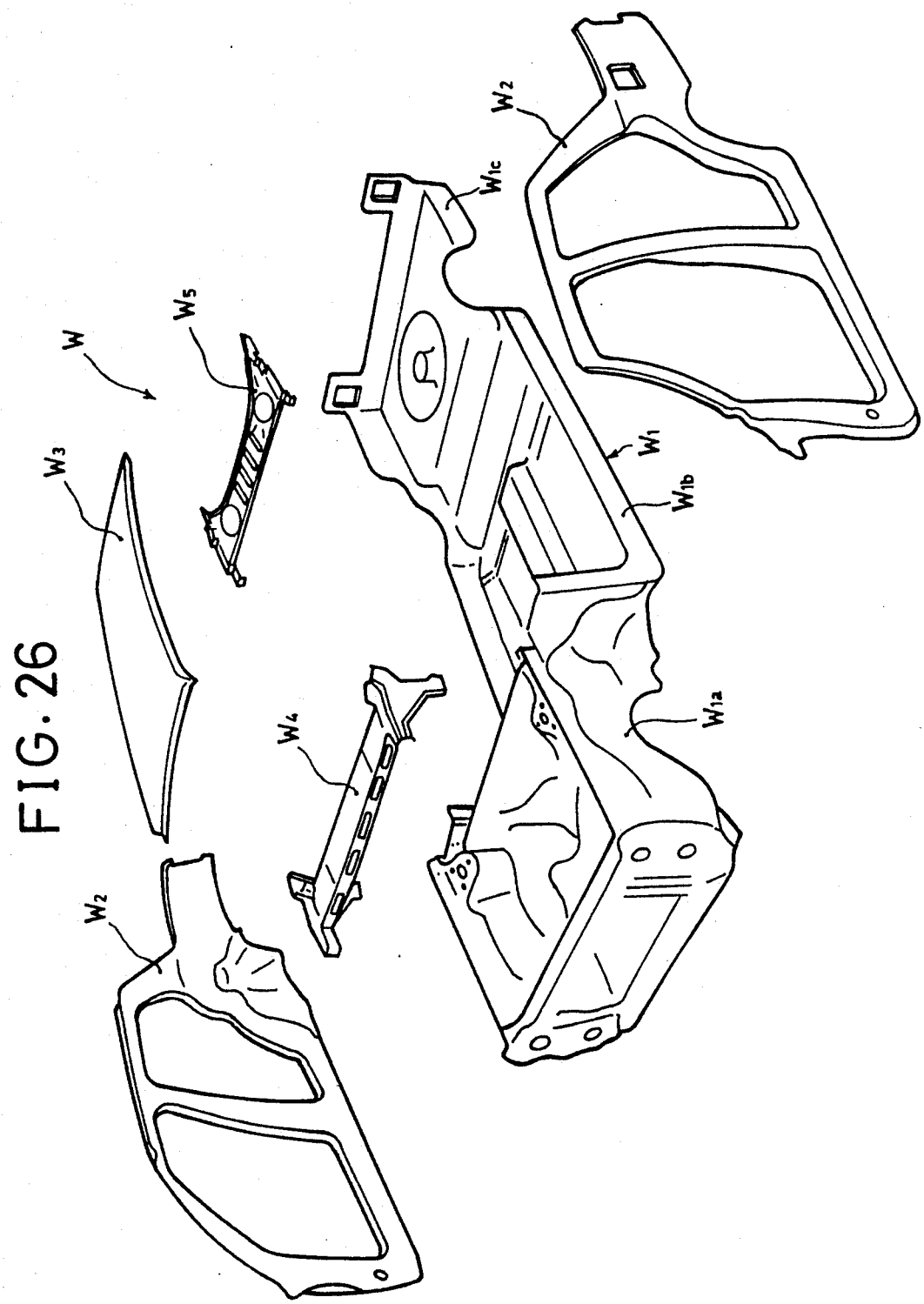

SYSTEM FOR ASSEMBLING MOTORCAR VEHICLE BODY

BACKGROUND OF THE INVENTION

This invention relates to a system for assembling a motorcar vehicle body by combining a floor panel, side panels and a roof panel.

There is known in Japanese Published Unexamined Patent Application No. 160970/1987 a system for assembling a motorcar vehicle body in which: there is disposed a floor panel assembling line on an upper stream side of a vehicle body assembling station which has on both right and left sides thereof welding jigs on which side panels can be set; side panel working lines are disposed on both sides of the floor panel asembling line; a roof panel is transported to a neighborhood of the vehicle body assembling station by a hanger conveyor or the like; the roof panel and the floor panel from the floor panel assembling line are charged to the vehicle body assembling station by appropriate transporting and setting means; the side panels from the side panel working lines are set to the welding jigs and are combined to the roof panel and the floor panel, thereby assembling the motorcar vehicle body.

It is normal practice to make up the floor panel by combining three parts of a front component which constitutes an engine room, a front floor which constitutes a motorcar compartment floor, and a rear floor which constitutes a trunk room. These floor panel constituting parts are worked in each of working lines which are provided apart from a main working line including the floor panel assembling line, and are transported from these working lines to the floor panel assembling line by hanger conveyors or the like. These parts are then combined in the floor panel assembling line to assemble the floor panel. Regarding the roof panel, it is also arranged that the roof panel is transported from a roof panel working line which is provided far from the main working line to a neighborhood of the vehicle body assembling station by a hanger conveyor or the like.

In the above-described system, however, the transporting path such as the hanger conveyor to transport the floor panel constituting parts and the roof panel to the floor panel assembling line or to the vehicle body assembling station, becomes long. In addition, the hanger conveyor is disposed inside a factory in a very complicated and congested layout. It has therefore a disadvantage in that the material handling system for the floor constituting parts and the roof panel becomes complicated.

OBJECT AND SUMMARY OF THE INVENTION

In view of the above-described disadvantages, this invention has an object of providing a system for assembling a motorcar vehicle body: in which working lines for the floor panel constituting parts and the roof panel are disposed above the main working line to three-dimensionally utilize the space inside the factory; in which each of the parts is arranged to be transported from the working lines to a required position of the main working line from an upper position at a shortest distance possible so that the material handling system is simplified.

In order to attain the above-described object, according to this invention, there is provided a system comprising: a first-floor portion; a second-floor portion; the first-floor portion having a main working line provided with a vehicle body assembling station having disposed on both sides thereof welding apparatuses having welding jigs on which side panels can be set in position, a floor panel assembling line which is disposed on an upper-stream side of the vehicle body assembling station, and a floor panel parts working line which is disposed on a still further upper-stream side of the vehicle body assembling station for working partial floor panel constituting parts; the second-floor portion having another floor panel parts working line for working remaining floor panel constituting parts and a roof panel working line; means for charging the floor panel constituting parts worked in the floor panel parts working line disposed on the first-floor portion to the patial floor panel assembling line; means for lowering the remaining floor panel constituting parts worked in the floor panel parts working line disposed on the second-floor portion from the second-floor portion to charge them to the floor panel assembling line so that these constituting parts are combined together in the floor panel assembling line to assemble the floor panel; means for charging the floor panel to the vehicle body assembling station; and means for lowering the roof panel worked in the roof panel working line from the second-floor portion to a neighborhood of the vehicle body assembling station and charging it to the vehicle body assembling station so that the side panels which are set to the welding jigs are combined in the vehicle body assembling station to the floor panel and the roof panel to assemble the motor car vehicle body.

The floor panel constituting parts which are worked in the floor panel parts working line provided on the first-floor portion and the other floor panel constituting parts which are worked in the floor panel parts working line provided on the second-floor portion and are lowered from the second-floor portion to the floor panel assembling line, are combined together in the floor panel assembling line to assemble the floor panel. The floor panel is charged from this floor panel assembling line to the vehicle body assembling station. On the other hand, the roof panel which is worked in the roof panel working line is lowered from the second-floor portion to a neighborhood of the vehicle body assembling station for being charged to the vehicle body assembling station. The side panels which are set to the welding jigs of the welding apparatuses disposed on both sides of the assembling station, are combined with the roof panel and the floor panel, thereby assembling a motorcar vehicle body.

In this manner, by simply lowering the parts such as the floor panel constituting parts and the roof panel which are worked in the working lines disposed on the second-floor portion, each of these parts can be transported to the predetermined parts feeding positions in the neighborhood of the floor panel assembling line and the vehicle body assembling station which are provided on the first-floor portion. The material handling system from the working lines of each of the parts to the parts feeding positions can thus be arranged in a reasonable and space-efficient manner by utilizing the three-dimensional space.

In the conventional floor panel assembling line, as can be seen in Japanese Examined Utility Model Registration Application No. 28742/1983, a setting station into which the three parts of the front component, the front floor and the rear floor are transported, and a combining station provided with welding means are separately disposed. The three parts which are set in the setting station in a predetermined positional relationship are transported to the combining station by transporting means. Then, these three parts are welded together into a floor panel. Thereafter, the floor panel is reinforcing-welded.

In the above-described conventional example, misalignment among the three parts may happen, resulting in an error in the floor panel assembling accuracy, when they are handed over, in the process of transporting from the setting station to the combining station, from the transporting means to the jigs on each of the stations. In addition, because two stations of the setting station and the combining station must be provided, there is a disadvantage in that the length of the working line becomes long.

In order to eliminate these disadvantages, according to another feature of this invention, the floor panel assembling line comprises a combining station for charging thereinto each of the constituting parts which constitute the floor panel by each transfer means, the combining station comprising: a setting jig for positioning and holding the constituting parts in a predetermined positional relationship; and welding robots which are provided on both sides of the combining station for welding the constituting parts held on the setting jig.

According to this arrangement, the floor panel constituting parts, i.e., the three parts of the front component, the front floor and the rear floor which are set to the setting jig in a predetermined positional relationship, can be combined in a condition as they are. Therefore, the error in the assembling accuracy of the floor panel can be reduced to a lowest extent possible. In addition, since the three parts can be set and combined in the same station, the line length of the floor panel assembling line can also be shortened.

Supposing that the direction in which the floor panel is discharged from the combining station is a front direction and that, among the front component and the rear floor, the one to be combined to the rear portion of the front floor is defined to be the rear-parts (the front component in the embodying example) and that to be combined to the front portion of the front floor is defined to be the front-parts (the rear floor in the embodying example), the rear-parts can be placed from the rear position of the combining station to the setting jig which is in the combining station. The front floor and the front-parts, however, must be transferred to the setting jig from an upper position in order to prevent the interference with the welding robots which are disposed on both sides of the combining station. In this case, a most reasonable material handling system can be established if the working line for the front floor and the working line for the front-parts are provided on the second-floor portion and the front floor and the front-parts are lowered from the second floor portion to set them to the setting jig from an upper position of the combining station.

Therefore, according to another feature of this invention, there are provided transporting means for the front floor and the front-parts, respectively, which lower the front floor and the front-parts from the second floor portion to a feeding position above the combining station. The front floor and the front-parts which are transported to the feeding position are received by each of the transfer means and the front floor and the front-parts are placed by the transfer means on the setting jig after aligning the position in the longitudinal direction. More concretely, the respective transporting means for the front floor and the front-parts are provided in order to transport the front floor and the front-parts to the feeding position above the position of the welding robots on one side of the combining station. Each of the front floor tranfer means and the front-parts transfer means is composed of a lifting frame which is disposed on a supporting column so as to be movable up and down, the supporting column being vertically provided above the location of the welding robots on the other side of the combining station, a movable frame which is provided on said lifting frame so as to be shifted between an upper position of the combining station and one side thereof, and a transfer jig which is suspended from the movable frame for holding the front floor and the front-parts. According to this arrangement, in a condition in which the lifting frames of the transfer means are lifted, the movable frames are shifted to one side, and the parts which are transported to the feeding position are received by the transfer jigs of each of the transfer means. Then, the movable frames are returned to the side of the station to shift each of the parts to an upper position of the combining station. In this condition, the lifting frames are lowered and the transfer jigs are moved back and forth. It is thus possible to place each of the parts to the setting jig in a predetermined positional relationship without giving rise to interference with the welding robots on both sides of the station. In addition, according to this arrangement, the space for laying out the transfer means can be contained within a width of the combining station inclusive of the disposing portion of the welding robots, thereby improving the space efficiency.

The working line for the floor panel constituting parts which is disposed on the first-floor portion is used as the working line for the rear-parts; the rear-parts are fed from the working line to the feeding position which is in the rear of the combining station.

In order to cope with the change in the kind of vehicle body, it becomes necessary to exchange the setting jig. However, since there are provided the welding robots on both sides of the combining station and the transfer apparatus, in front thereof, for transporting the floor panel to reinforcing-welding stations, it is difficult to exchange the setting jig by withdrawing it to the lateral side or the front side of the combining station. It is therefore preferable to provide an exchanging station between the combining station and the rear-parts feeding position in the rear thereof to make the setting jig exchangeable by withdrawing it from the combining station. In this case, the rear-parts transfer means is composed of a travelling frame which moves back and forth between the rear feeding position and the combining station along a guide frame extended over an upper space of the exchanging station, and a transfer jig which holds the rear-parts and is suspended from the travelling frame so as to be movable up and down. In this manner, the rear-parts can be transferred to the setting jig by using the upper space of the exchanging station as the transporting path.

As an apparatus for inserting, in a vehicle body assembling station, a roof panel as well as interposing parts such as a dash board upper piece, a rear tray piece or the like into a space between right and left side panels to combine the interposing parts to the side panels, there is conventionally known one as disclosed in Japanese Published Unexamined Patent Application No.

232070/1986. In this apparatus, a charging apparatus of suspension type having mounted thereon holding devices on which the roof panel and the interposing parts are mounted, is provided movably back and forth between a vehicle body assembling station and a nearby transfer station. On a side of the transfer station, there is disposed a transfer device having mounted thereon a jig on which the roof panel and the interposing parts can be placed in a predetermined positional relationship. By the operation of the transfer device, the jig is advanced to the transfer station from a side direction to hand over the roof panel and the interposing parts on the jig to the charging apparatus which is retreated to the transfer station. Then, by the advancing movement of the charging apparatus to the vehicle body assembling station, the roof panel and the interposing parts are set to the space between the side panels from an upper position.

In this apparatus, it is normal practice to manually carry out the work of placing the workpieces to the jig of the transfer device. This gives rise to a problem in improving the productivity.

It can be considered to automatically place the workpieces to the jig by a loading apparatus. It is, however, difficult to dispose the loading apparatus for the workpieces comprising the roof panel and the interposing parts in a limited space along the side of the working line. In addition, the transporting of the workpieces from the working line to the transfer station must depend on the manual work because of the difficulty in laying out the conveyor, thereby making it difficult to automate it.

On the contrary, when the second-floor portion is provided as in this invention, it is possible to automate the transporting work of the workpieces by providing on the second-floor portion the working line for the interposing parts, aside from the working line for the roof panel, and lowering the interposing parts together with the roof panel from the second-floor portion by a transporting means such as a drop lifter to place them to the transfer device.

In this case, the roof panel and the interposing parts may be arranged to be lowered from the second floor portion by individually arranged transporting means. This, however, complicates the transporting equipment. On the contrary, the transporting work of the roof panel and the interposing parts from the working lines to the transfer device can be completely automated and the transporting equipment can be simplified by the following arrangement. Namely, a pallet on which the roof panel and the interposing parts can be placed in a predetermined positional relationship is used. The transfer device is arranged such that the pallet is advanced to the transfer station from a side thereof to hand over the roof panel and the interposing parts to the charging apparatus. In addition, a drop lifter is provided to hand over the pallet to and from the the transfer device so that it is movable up and down between the second floor portion and the transfer device. And a loading apparatus is provided on the second-floor portion to place the roof panel and the interposing parts to the pallet lifted by the drop lifter in a predetermined positional relationship.

The working lines for the side panels may be provided on both sides of the floor panel assembling line as in the above-described conventional art. However, if the working lines for the side panels are provided on the second floor portion, the reinforcing-welding line or the like can be disposed on both sides of the floor panel assembling line on the first-floor portion. Thus, the space efficiency of the first-floor portion can be improved.

BRIEF DESCRIPTION OF THE DRAWINGS

The above and other objects and the attendant advantages of this invention will become readily apparent by reference to the following detailed description when considered in conjunction with the accompanying drawings wherein:

FIG. 15 is a sectional front view taken along the line XV—XV in FIG. 13;

FIG. 16 is a plan view of a floor panel charging apparatus;

FIG. 17 is a side view viewed from the line XVII—XVII in FIG. 16;

FIG. 26 is an exploded perspective view of a motor-car vehicle body.

DETAILED DESCRIPTION OF A PREFERRED EMBODIMENT

An illustrated embodying example is for assembling a floor panel $W_1$, side panels $W_2$, a roof panel $W_3$, a dash board upper piece $W_4$ and a rear tray piece $W_5$, as shown in FIG. 26, into a motorcar vehicle body W. The floor panel $W_1$ is made up by combining a front component $W_{1a}$ constituting an engine room, a front floor $W_{1b}$ constituting a motorcar compartment floor and a rear floor $W_{1c}$ constituting a trunk room floor.

There are provided a first-floor portion 1 and a second-floor portion 2 inside an assembling factory. On the first-floor portion 1, there are provided, as shown in FIGS. 1 and 2(a), a main line 3, a reinforcing-welding line 4 for the motorcar vehicle body W on one of the right and left sides thereof and, on the other side thereof, a post-step line 5 having a MIG welding step 5a for internal plates of the motorcar vehicle body W, a sealing and coking step 5b, a manual welding step 5c and an external parts assembling step 5d for assembling to the motorcar vehicle body W external parts such as a bonnet, a tail gate, front fenders, doors or the like.

In the main line 3, there are provided, from an upper stream side towards a downstream side thereof, a working line 6 for the front component $W_{1a}$, an assembling line 7 for the floor panel $W_1$ and an assembling line 8 for the motorcar vehicle body W.

Figure 1:
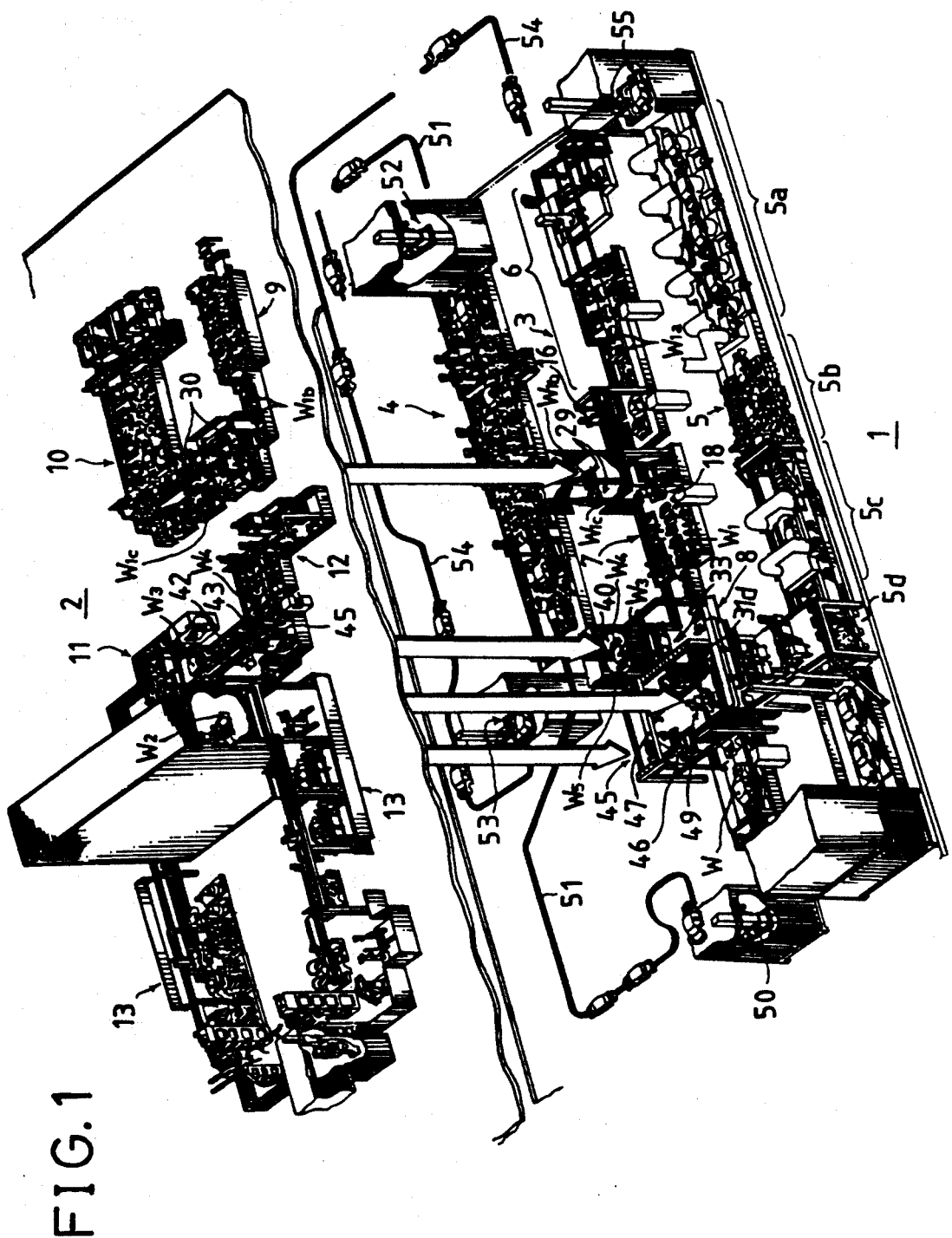
FIG. 1 is an overall perspective view of an example of this invention system.
Figure 2A:
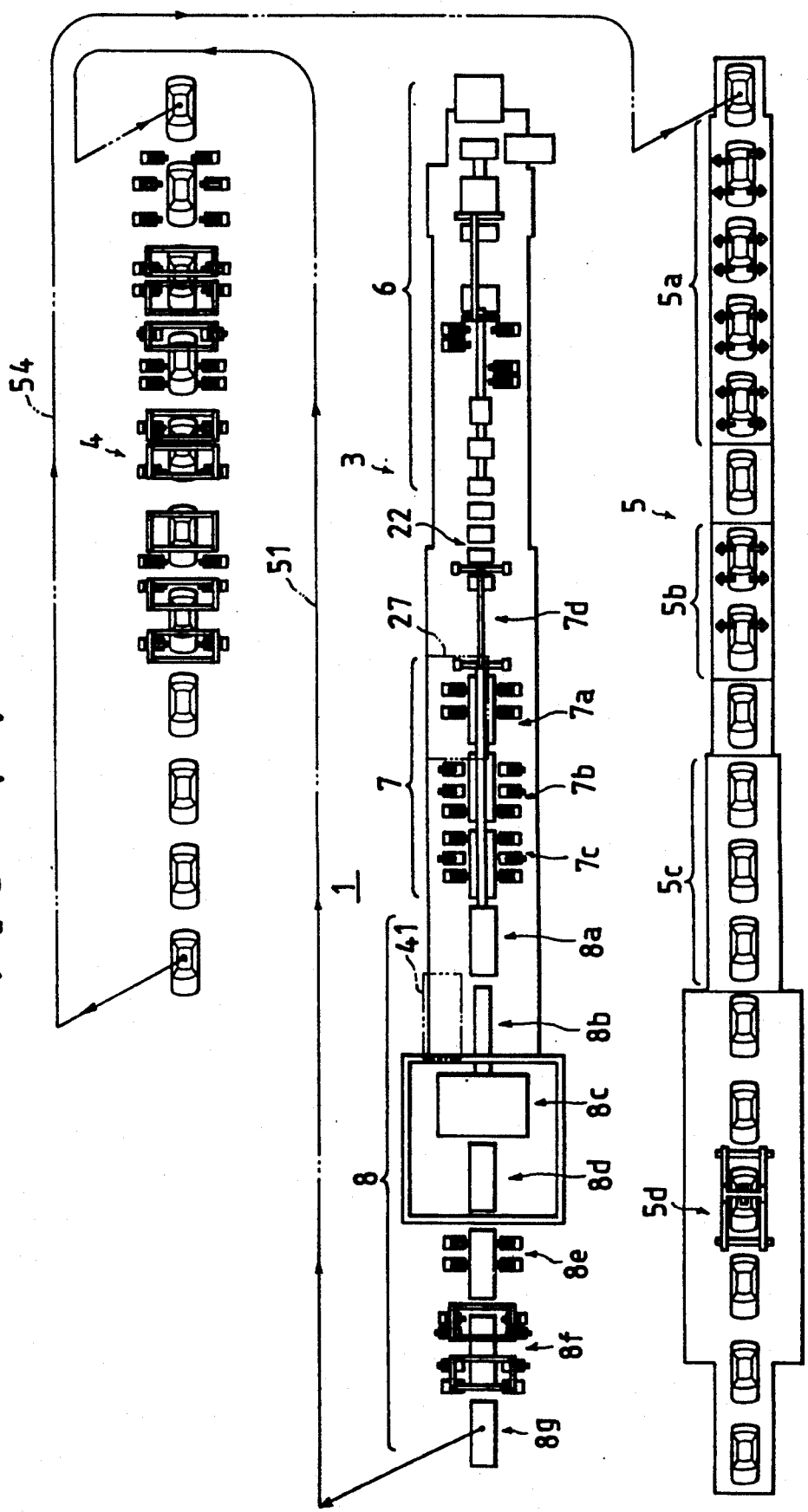
FIG. 2 (a), (b) are plan views of a first floor portion and a second floor portion, respectively.
Figure 2B:
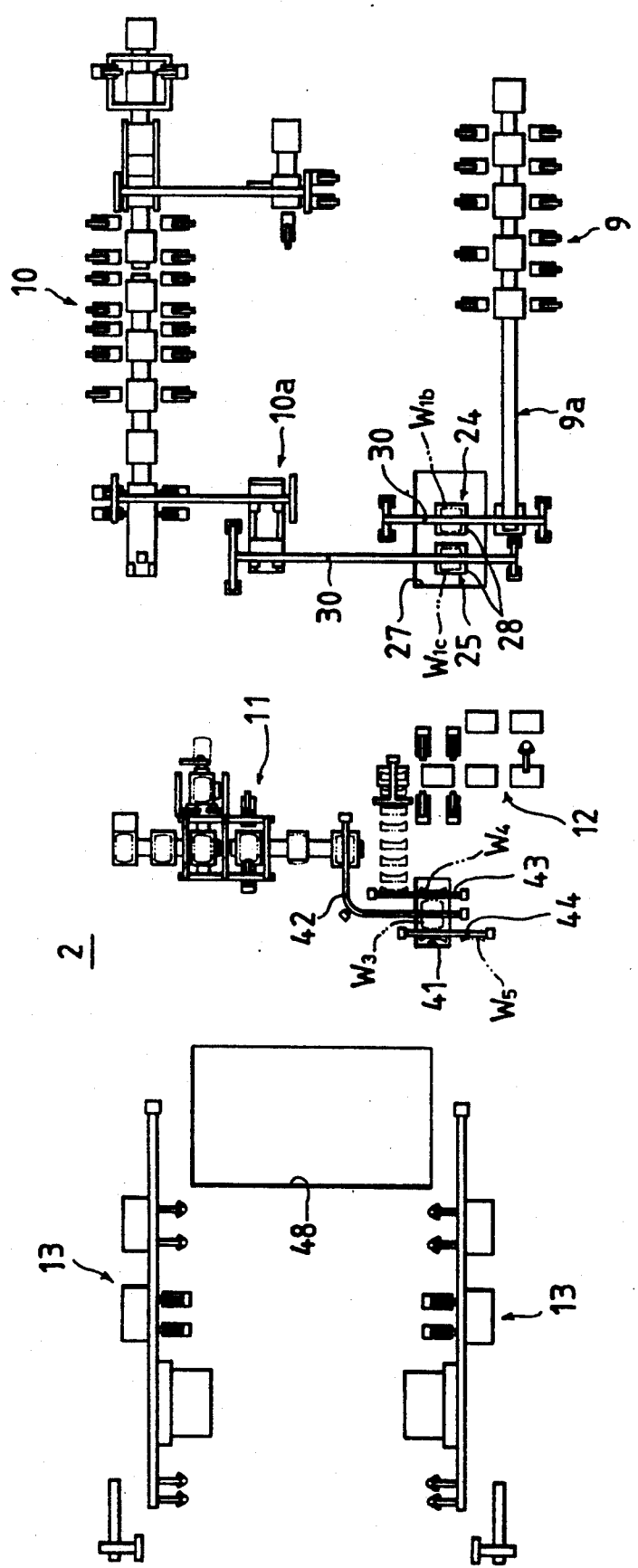

On the second-floor portion 2, there are provided in parallel above the front component working line 6, as shown in FIGS. 1 and 2(b), a working line 9 for the front floor $W_{1b}$ and a working line 10 for the rear floor $W_{1c}$. In a position above the floor panel assembling line 7, there are provided a working line 11 for the roof panel $W_3$ and a working line 12 for the dash board upper piece $W_4$. In front thereof there are further provided a pair of right and left working lines 13, 13 for the side panels $W_2$.

Figure 3:
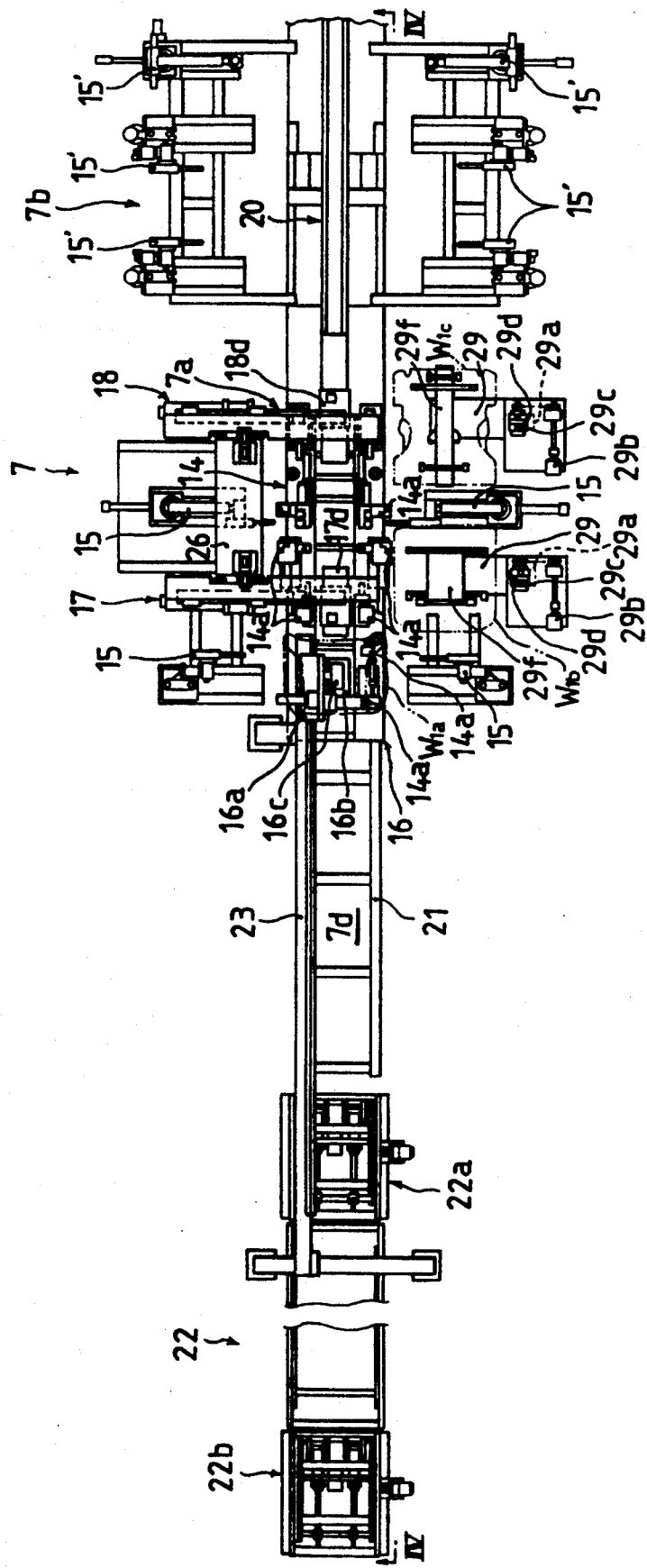
FIG. 3 is a plan view of a floor panel assembling line.
Figure 4:
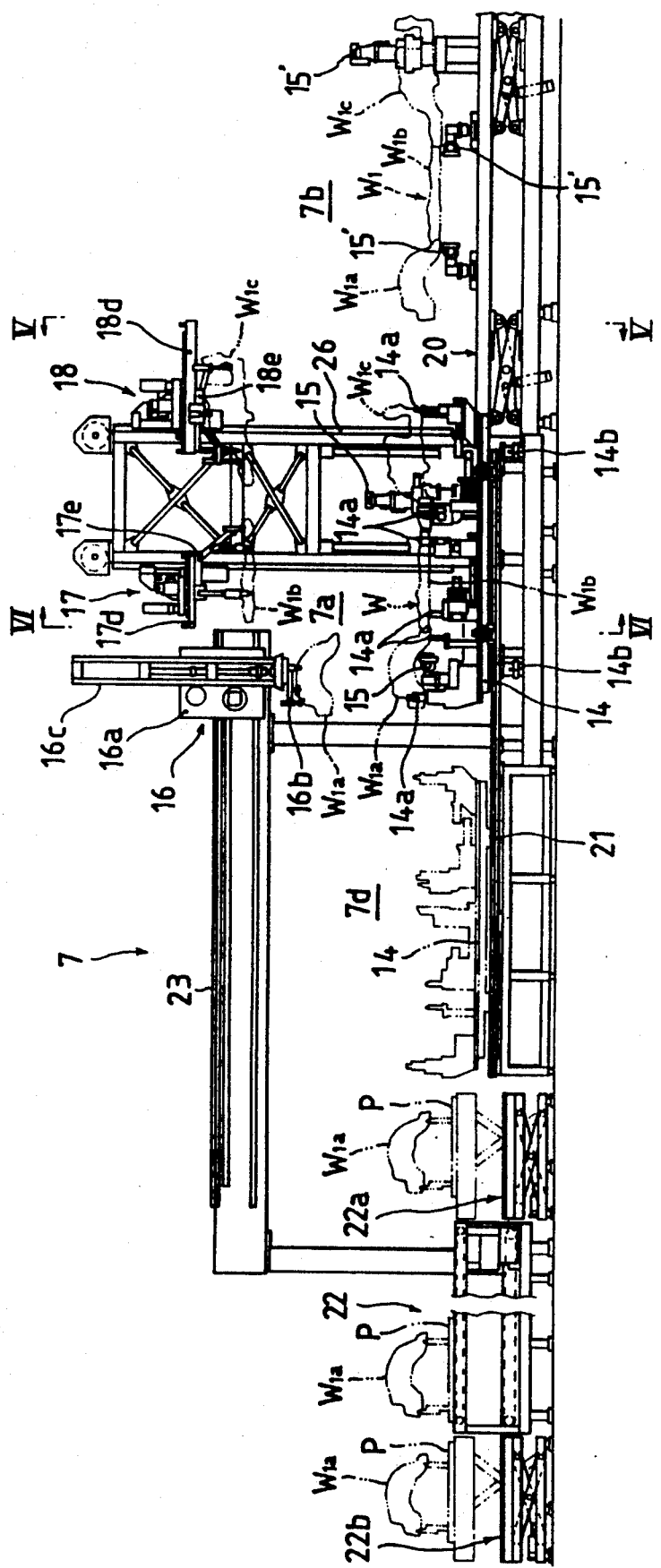
FIG. 4 is a side view viewed from the line IV—IV in FIG. 3.

The floor panel assembling line 7 is provided with a combining station 7a for combining the front component $W_{1a}$, the front floor $W_{1b}$ and the rear floor $W_{1c}$, and two stages of front and rear reinforcing-welding stations 7b, 7c. In the combining station 7a, there is provided, as shown in FIGS. 3 and 4, a setting jig 14 for positioning and supporting the three parts of the front component $W_{1a}$, the front floor $W_{1b}$ and the rear floor $W_{1c}$ in a predetermined positional relationship. There are further provided two sets each of front and rear welding robots 15, 15 on both sides of the station 7a. Each of the parts is placed on the setting jig 14 by respective transfer means 16, 17, 18 and, in a condition in which these parts are positioned and supported by the setting jig 14 in a predetermined positional relationship, the front floor $W_{1b}$ and the front component $W_{1a}$ which is in the rear (as seen in the transporting direction) thereof are welded together by the welding robots 15 on the rear side. The front floor $W_{1b}$ and the rear floor $W_{1c}$ which is positioned in front thereof are welded together by the front welding robots 15 on the front side. The floor panel $W_1$ thus assembled is transferred in sequence by a transfer apparatus 20 to the reinforcing-welding stations 7b, 7c which are in front of the combining station 7a so that reinforcing-welding can be carried out to the floor panel $W_1$ by the welding robots 15' which are disposed on both sides of the reinforcing-welding stations 7b, 7c. The setting jig 14 is provided on its upper both side portions with a plurality of positioning members 14a for positioning and supporting the above-described three parts $W_{1a}$, $W_{1b}$, $W_{1c}$. Further, a jig exchanging station 7d is provided in the rear of the combining station 7a. Rails 21 are laid between the two stations 7a, 7d so that the setting jig 14 is supported by the rails and can be pulled in and out from the combining station 7a to the exchanging station 7d for exchanging the setting jig 14. The setting jig 14 is normally restricted by cylinders 14b to a predetermined position in the combining station 7b, as shown in FIGS. 5 and 6.

The front component $W_{1a}$ is transported by a transporting means 22 from the working line 6 to a feeding position which is close to the rear of the exchanging station 7d. It is then transported by the transfer means 16 through an upper space of the exchanging station 7d and is placed on the setting jig 14. In more detail, the transporting means 22 transports the front component $W_{1a}$ to the feeding position which is positioned in the front end while it is placed on a pallet P. The emptied pallet P is returned backwards by lowering it by a lifting-down apparatus 22a. The pallet P is lifted by a lifting-up apparatus 22b which is in the rear end. The pallet P is transported to the feeding position by placing thereon the floor component $W_{1a}$ which is discharged from the working line 6. It is so arranged that the above-discribed operations are repeated. The transfer means 16 comprises a travelling frame 16a which can be reciprocated between the feeding position and the combining station 7a along a guide frame 23 which is extended in a space above the exchanging station 7d, and a transfer jig 16b which is provided with a plurality of clamping members for clamping the front component $W_{1a}$ and is suspended so as to be movable up and down along a vertically provided column 16c. By retreating the travelling frame 16a to the feeding position and then lowering the transfer jig 16b, the front component $W_{1a}$ to be supplied by the transporting means 22 is received by the transfer jig 16b. After lifting the transfer jig 16b and then advancing the travelling frame 16a to the combining station 7a, the transfer jig 16b is lowered to place the front component $W_{1a}$ to a rear portion of the setting jig 14.

Figure 5:
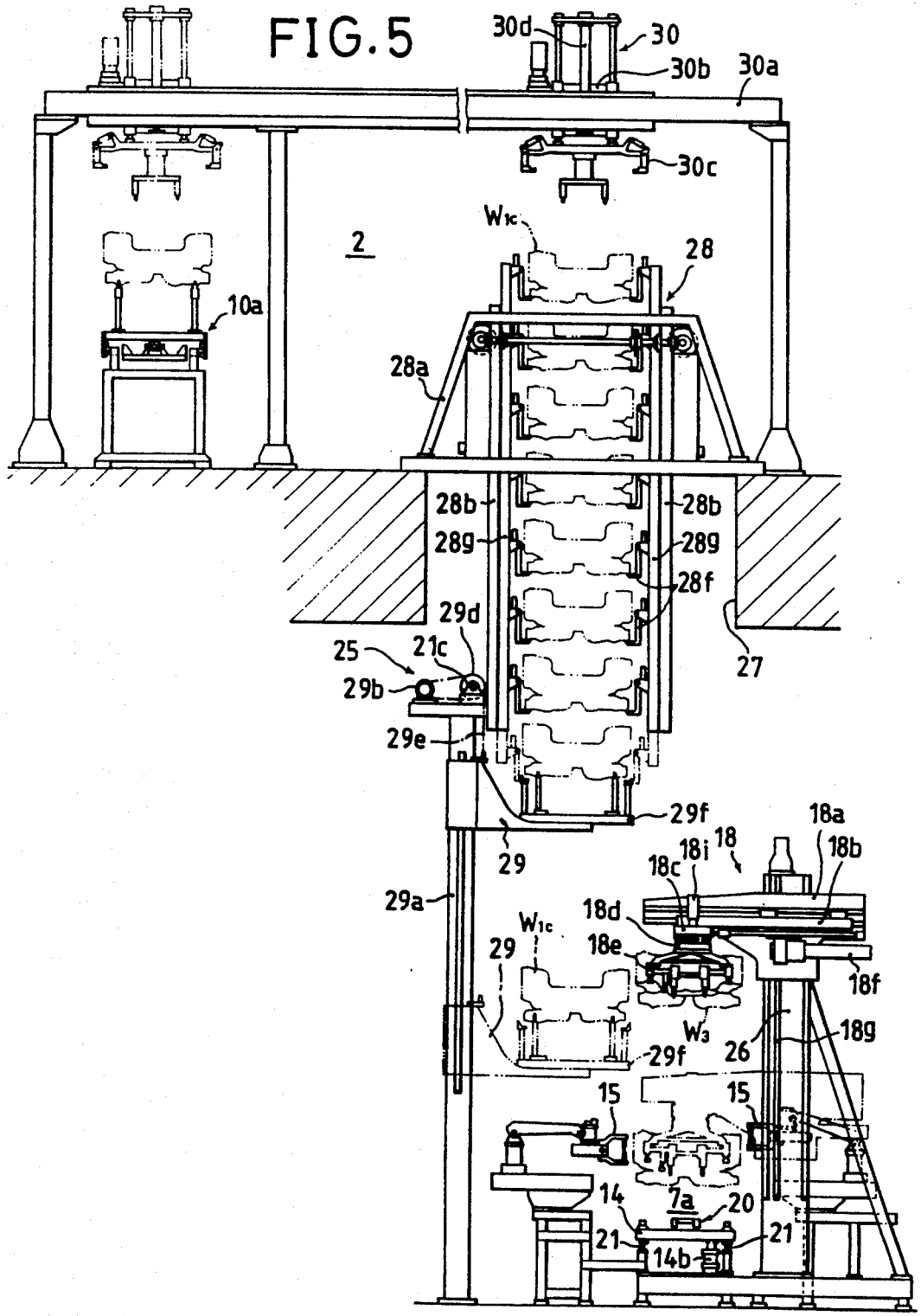
FIGS. 5 and 6 are sectional views taken along the lines V—V and VI—VI, respectively, in FIG. 4.
Figure 6:
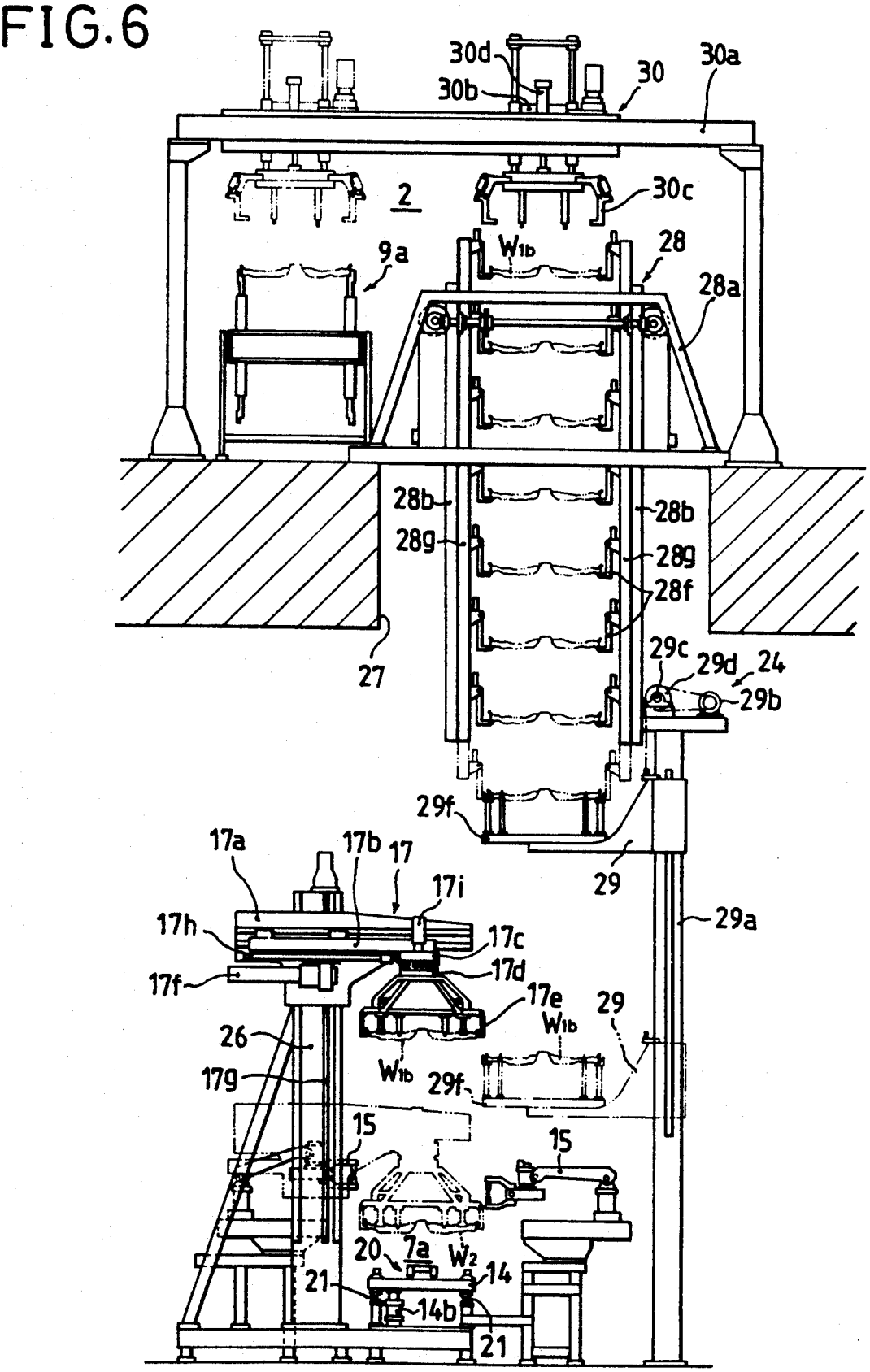

The transfer means 17, 18 for the front floor $W_{1b}$ and the rear floor $W_{1c}$ are so constructed, as shown in FIGS. 5 and 6, as to place on the setting jig 14 the front floor $W_{1b}$ and the rear floor $W_{1c}$ which are transported from the second floor portion 2 to the two front and rear feeding positions above the location of the welding robots 15 on one side of the combining station 7a, by transporting means 24, 25 which are described in detail hereinafter. The transfer means 17, 18 are disposed so as to be movable up and down at each of the front and the rear sides of a supporting frame 26 which is provided so as to extend over the location of the front-side welding robot 15 on the other side of the combining station 7a.

Figure 7:
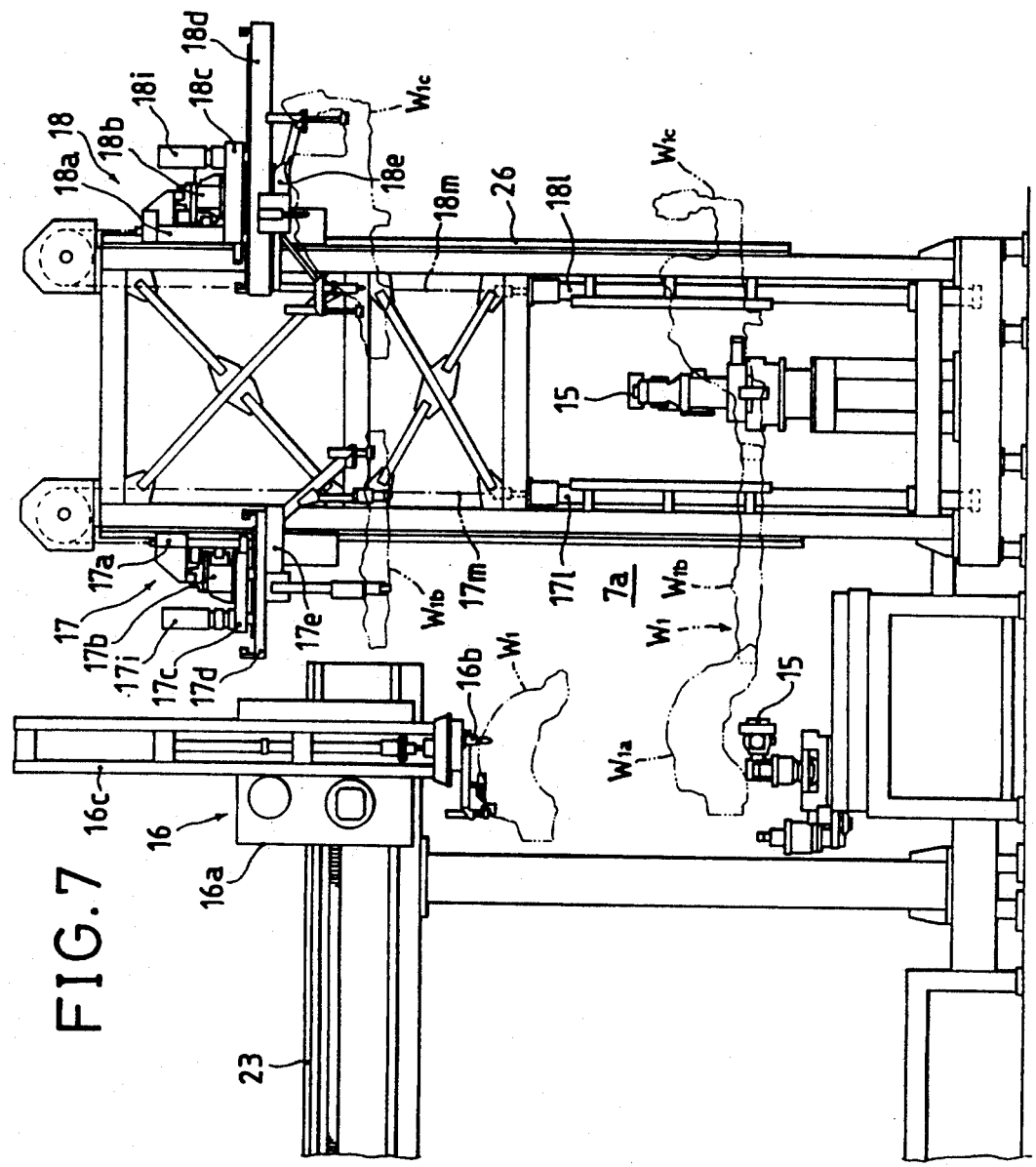
FIG. 7 is an enlarged side view of transfer means for a front floor and a rear floor.
Figure 8:
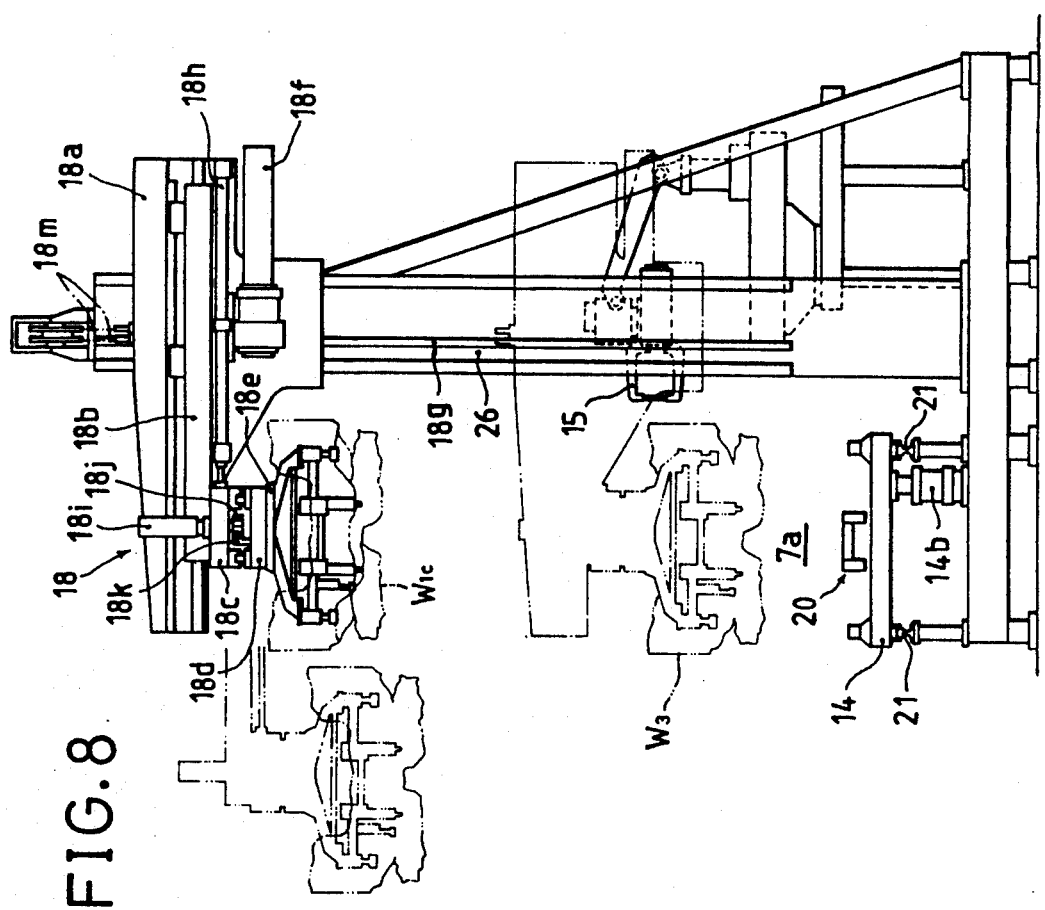
FIG. 8 is a front view of the rear floor transfer means viewed from the right-hand side in FIG. 7.

The transfer means 18 for the rear floor $W_{1c}$ comprises, as shown in FIGS. 7 and 8: a lifting frame 18a which is so provided as to be movable up and down on the front side surface of the supporting frame 26; a movable frame 18c which is mounted on the lifting frame 18a via a laterally elongated arm 18b so as to be movable between an upper position above the combining station 7a and one side thereof; a longitudinally elongated supporting frame 18d which is mounted on the lower side of the movable frame 18c so as to be movable back and forth; and a transfer jig 18e which is suspended from the supporting frame 18d and is provided with a plurality of clamping devices for clamping the rear floor $W_{1c}$. The lifting frame 18a is moved up and down by an electric motor 18f which is mounted thereon, via a rack-and-pinion mechanism which comprises a pinion (not shown) to be operated in association with the electric motor 18f and a rack 18g which is fixed to the supporting frame 26. At the lifted position of the lifting frame 18a, the movable frame 18c is shifted to one side by a cylinder 18h, and the rear floor $W_{1c}$ which has been transported by the transporting means 25 to the feeding position above the location of the welding robots 15 on one side is received by the transfer jig 18e. Then, the movable frame 18c is returned to the position facing the combining station 7a and, also, the supporting frame 18d is moved backwards by an electric motor 18i on the movable frame 18c via a rack-and-pinion mechanism which comprises a pinion 18j to be operated in association with the electric motor 18i and a rack 18k on the supporting frame 18d. The rear floor $W_{1c}$ is thus adjusted in its position so that the rear edge thereof is overlapped with the front edge of the front floor $W_{1b}$. In this condition, the lifting frame 18a is lowered to mount the rear floor $W_{1c}$ on the setting jig 14. In the drawings, numeral 18l denotes a balance cylinder which is connected to the lifting frame 18a via a chain 18m.

The transfer means 17 for the front floor $W_{1b}$ has almost a similar construction as that of the above-described transfer means 18. Therefore, its explanation is omitted by giving the numeral 17 affixed with the same alphabets as those affixed to the numeral 18 for the corresponding constituting elements.

On the second-floor portion 2, there is formed a lifting opening 27 in the floor which is located on one upper side of the combining station 7a. It is thus so arranged that the front floor $W_{1b}$ and the rear floor $W_{1c}$ which have been worked in each of the working lines 9, 10 are transported by each of the transporting means 24, 25 through the lifting opening 27 to each of the feeding positions above one side of the combining station 7a.

Each of the transporting means 24, 25 comprises: a stacking type of front and rear stocking device 28 which is vertically provided in a front and rear pair in the lifting opening 27; a drop lifter 29 which is movable up and down between a position right below the stocking device 28 and the feeding position; and a loading device 30 which feeds the part $W_{1b}$, $W_{1c}$ which is worked in each working line 9, 10 to each stocking device 28. Each of the parts $W_{1b}$, $W_{1c}$ is lowered by one step by each of the stocking devices 28 and the lowermost parts are lowered by each of the drop lifters 29 to the respective feeding positions to hand them over to the respective transfer means 17, 18.

Figure 9:
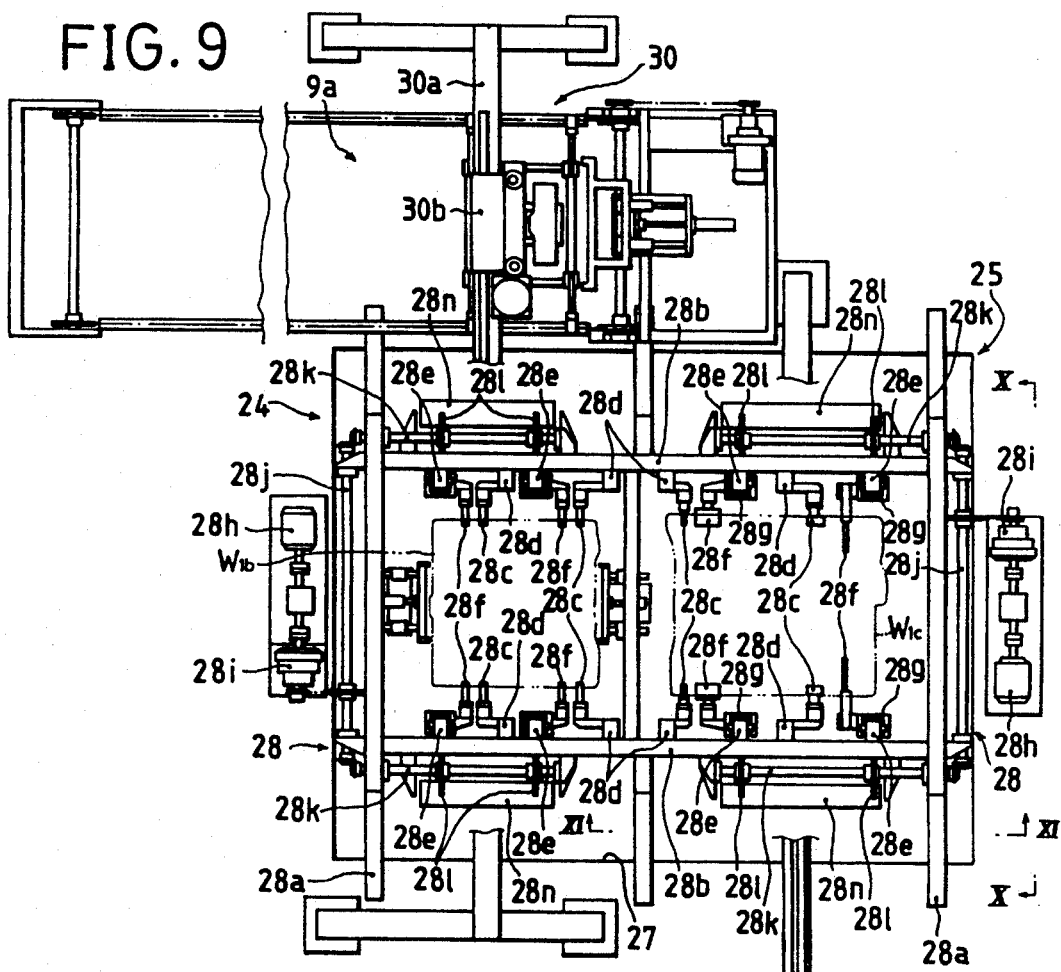
FIG. 9 is an enlarged plan view of a portion provided with a lifting opening for the front floor and the rear floor on the second-floor portion.
Figure 10:
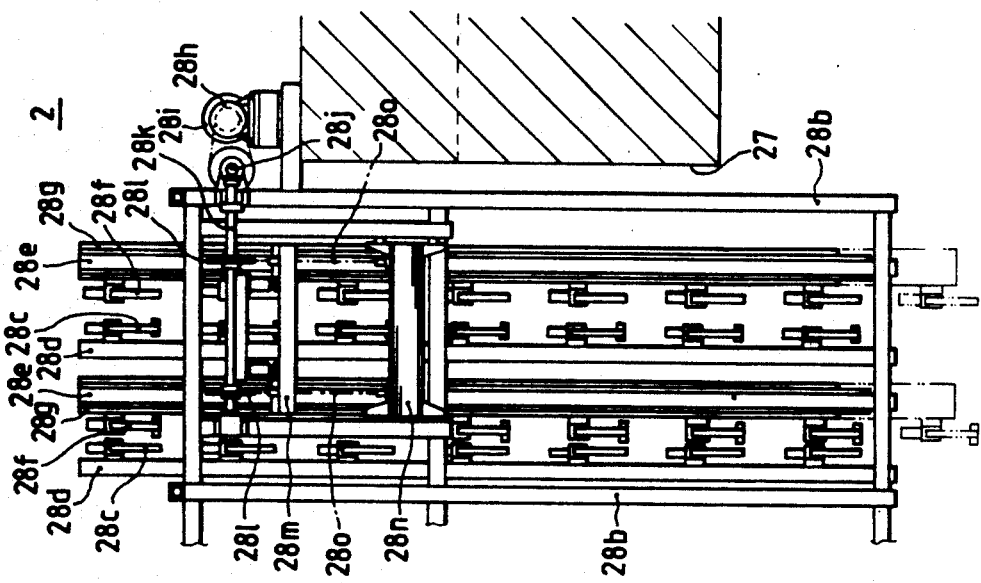
FIGS. 10 and 11 are sectional views taken along the lines X—X and XI—XI, respectively, in FIG. 9.
Figure 11:
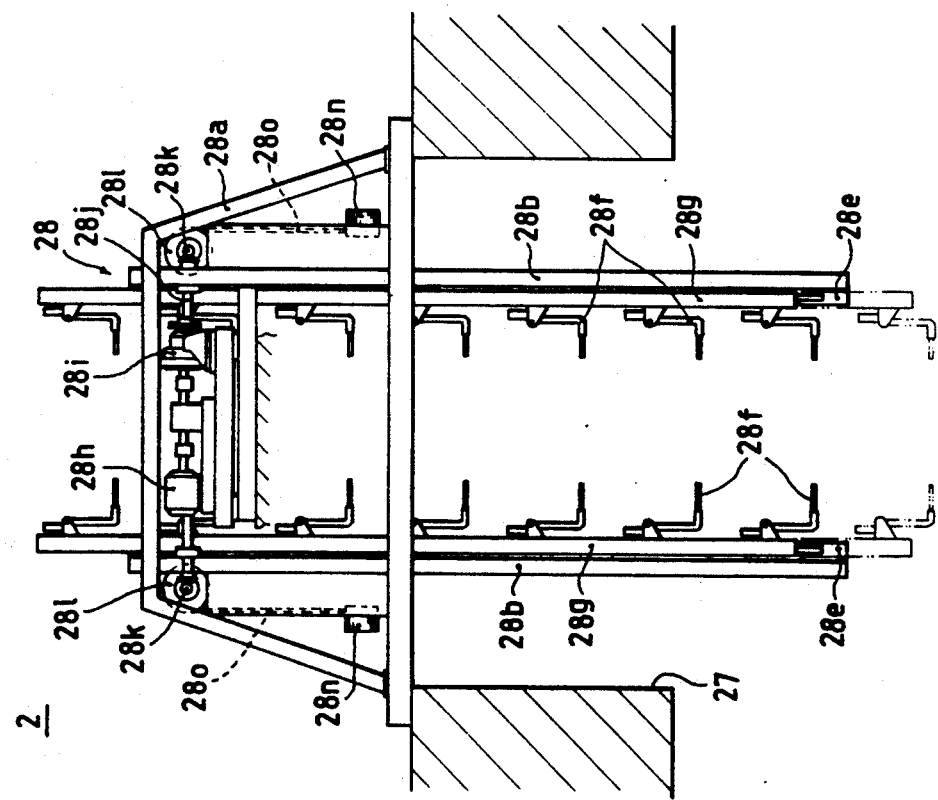

Each of the stocking devices 28 comprises, as shown in FIGS. 9 through 11: a frame 28a which is provided to extend over the lifting opening 27; a pair of right and left vertical frames 28b, 28b which pass through the lifting opening 27 and are fixed to the frame 28a; a pair of fixed bars 28d, 28d which are fixed to each of the vertical frames 28b and are provided with a plurality of vertical stages of hooks 28c for receiving the parts. To a pair of guide bars 28e, 28e which are fixed to each of the vertical frames 28b, there are provided a pair of movable bars 28g, 28g of C-shaped cross section which are movable up and down and are provided, in a plurality of vertical stages, with hooks 28f for receiving parts. Further, between upper ends of the vertical frames 28b, 28b, there are rotatably supported transmission shafts 28j which are driven by chains through reduction devices 28i by electric motors 28h disposed at front and rear ends of the lifting opening 27. On each of the vertical frames 28b, there is rotatably supported a rotatable shaft 28k which is connected via bevel gears to each end of the transmission shafts 28j. A pair of sprockets 28l are fixed to the rotatable shaft 28k. A chain 28o is wound around respective sprockets 28l, 28l with one end of the chain being connected to a cross bar 28m which is laterally provided between the movable bars 28g, 28g and with the other end of the chain being connected to a balance weight 28n. By rotating the electric motors 28h in one and the reverse directions, a total of 4 pieces, one pair each on the right and left side, of the movable bars 28g are moved up and down. The hooks 28c, 28f are made to be swingable inwards and outwards so that, by the upward and downward movement of the movable bars 28g and the swinging movement of the hooks 28c, 28f, the parts can be stocked in a plurality of layers on the stocking device 28.

Each of the drop lifters 29 is supported, as shown in FIGS. 3, 5 and 6, by each of supporting columns 29a which are vertically provided in a front and rear pair on one side of the combining station 7a. On an upper end of the respective supporting columns 29a, there are provided an electric motor 29b and that sprocket 29d on the rotatable shaft 29c which is driven by a chain by the electric motor 29b. A chain 29e is engaged with the sprocket 29d with one end of the chain being connected to the drop lifter 29 and the other end being connected to a balance weight which is not shown and is contained inside the supporting column 29a so as to be movable up and down. The drop lifter 29 is thus made to be movable up and down through the rotation of the electric motor 29b in one and the reverse directions. At the time of lowering of the movable bars 28g of the stocking device 28, the part to be supported by the hooks 28f at the lowermost stage is transferred to the jig 29f on the drop lifter 29 which is on the lifted position.

Each of the loading apparatuses 30 comprises, as shown in FIGS. 5 and 6, a travelling frame 30b which travels along an upper guide frame 30a extending over the lifting opening 27, and a jig 30c which si suspended from the travelling frame 30b so as to be movable up and down. By moving the travelling frame 30b sideways and then lowering the jig 30c, each of the parts on the discharging apparatuses 9a, 10a following the working lines 9, 10 is received by the jig 30c. Then, the jig 30c is lifted and the travelling frame 30b is moved to a position above each of the stocking devices 28. Thereafter, the jig 30c is lowered to place each part on the uppermost stage of the stocking device 28.

According to this embodiment, the front floor $W_{1b}$ and the rear floor $W_{1c}$ worked in each of the working lines 9, 10 on the second-floor portion 2 are fed to a position above the welding robots 15 on one side of the combining station 7a via the loading apparatus 30, the stocking device 28 and the drop lifter 29 of each of the transfer means 24, 25 in a condition in which they are kept apart in the longitudinal direction. Then, the transfer jigs 17e, 18e of the transfer means 17, 18 receive the front floor $W_{1b}$ and the rear floor $W_{1c}$ and are shifted to an upper position of the combining station 7a. At the same time, the front component $W_{1a}$ is transported to an upper position of the combining station 7a by the transfer means 16. Then, the transfer jig 16b of the transfer means 16 is lowered, and the front component $W_{1a}$ is placed on the rear of the setting jig 14 in the combining station 7a. At the same time, the lifting frame 18a of the transfer means 18 is lowered, and the transfer jig 18e is moved backwards by the operation of the supporting frame 18d, thereby placing the rear floor $W_{1c}$ on the front of the setting jig 14. Thereafter, the lifting frame 17a of the transfer means 17 is lowered and the transfer jig 17e is slightly moved backwards by the operation of the supporting frame 17d. The front floor $W_{1b}$ is thus placed on the middle portion of the setting jig 14 in such a positional relationship that the front and rear edges of the front floor $W_{1b}$ overlap with the edges of the front component $W_{1a}$ and the rear floor $W_{1b}$, respectively. Thereafter, the three parts of the front component $W_{1a}$, the front floor $W_{1b}$ and the rear floor $W_{1c}$ are accurately positioned by the positioning members 14a on the setting jig 14 in a predetermined positional relationship. In this condition, the three parts are welded together by the welding robots 15 and, thereafter, they are subjected to reinforcing welding in the reinforcing-welding stations 7b, 7c, thereby assembling the floor panel W.

Figure 12:
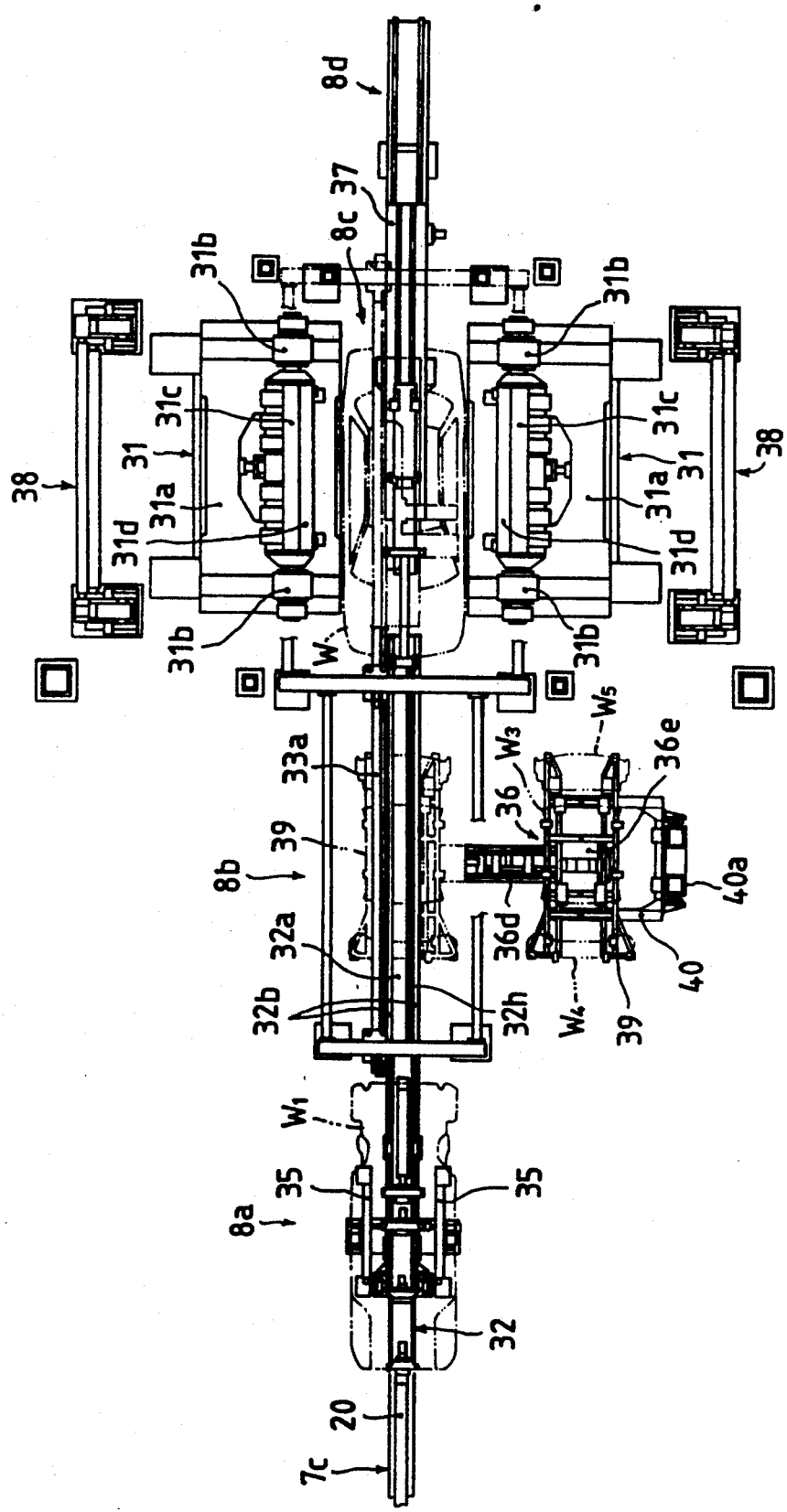
FIG. 12 is a plan view of a vehicle body assembling line.
Figure 13:
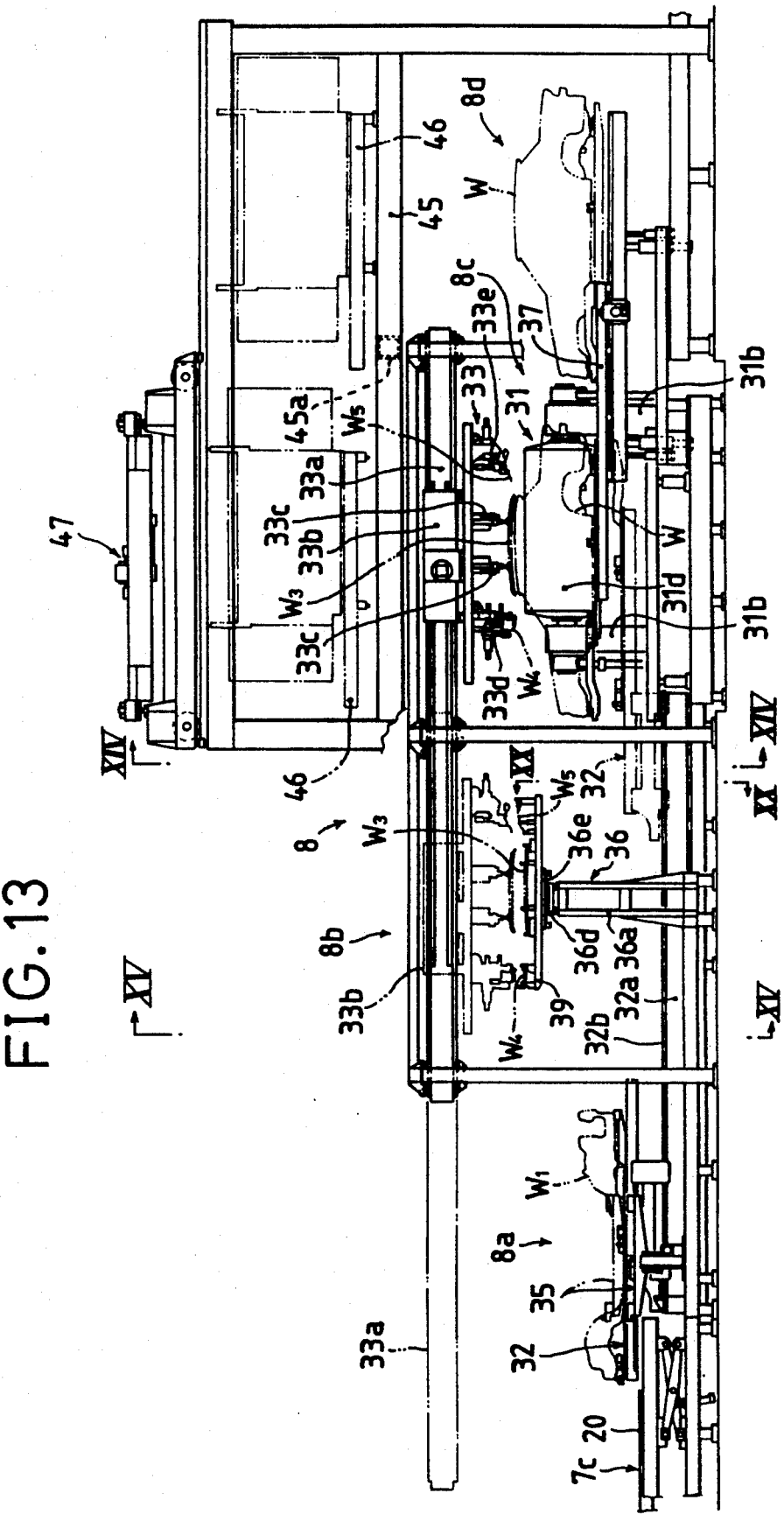
FIG. 13 is a side view thereof.
Figure 14:
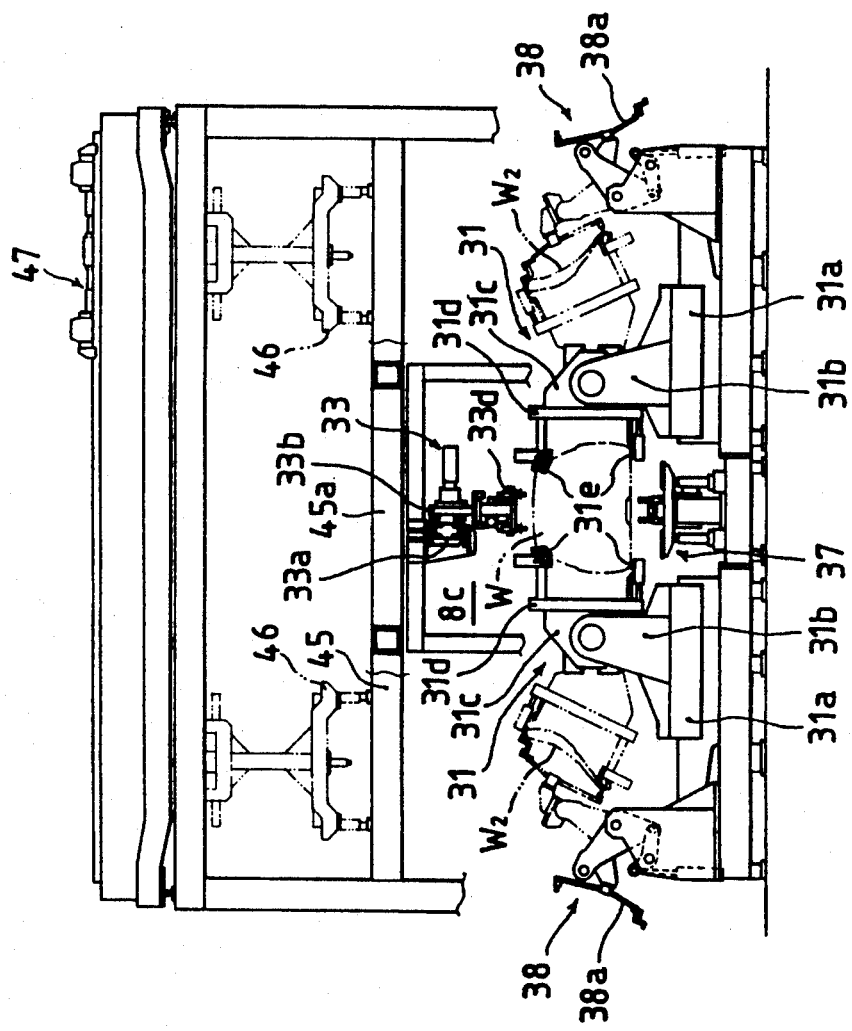
FIG. 14 is a sectional front view taken along the line XIV—XIV in FIG. 13.
Figure 18:
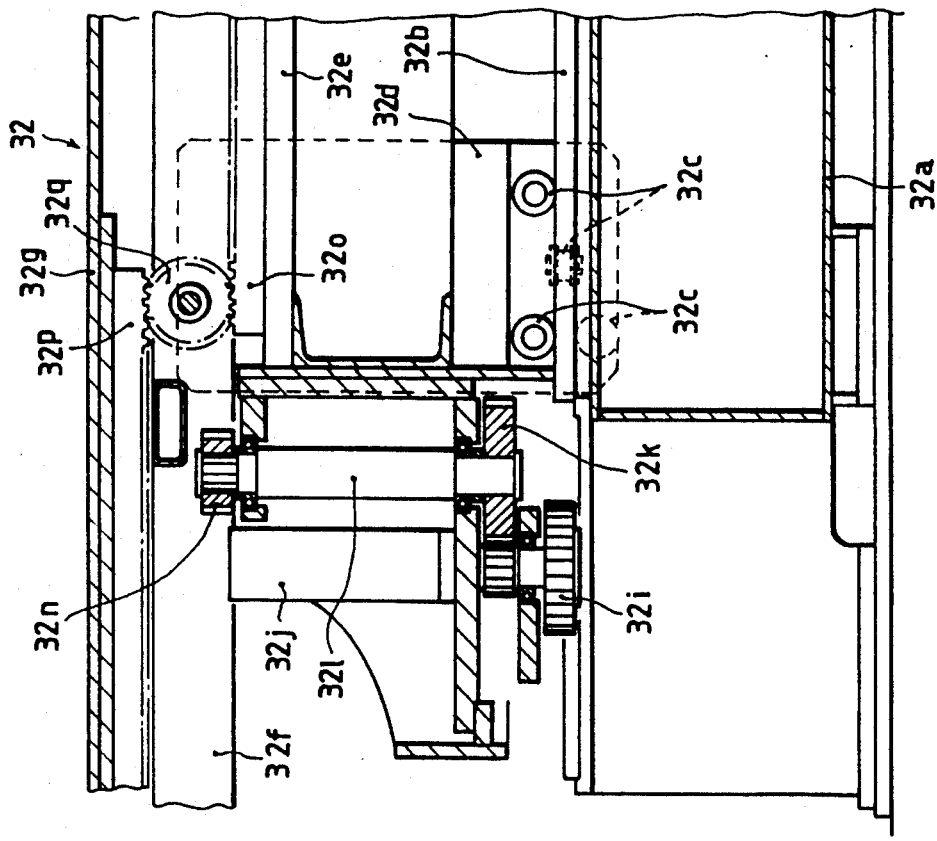
FIG. 18 is an enlarged sectional view taken along the line XVIII—XVIII in FIG. 17.
Figure 19:
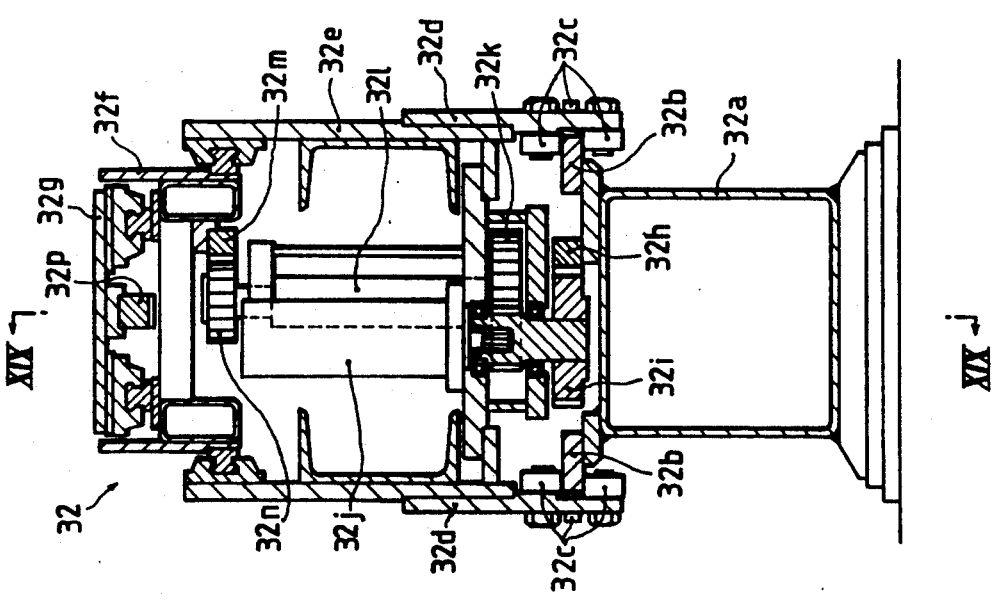
FIG. 19 is a sectional view taken along the line XIX—XIX in FIG. 18.

The vehicle body assembling line 8 comprises a floor panel transfer station 8a which is adjacent to the reinforcing-welding station 7c at the end of the floor panel assembling line 7, a roof panel transfer station 8b, a vehicle body assembling station 8c, an idling station 8d, two stages of front and rear reinforcing-welding stations 8e, 8f, and a discharging station 8g. As shown in FIGS. 12 through 14, a pair of welding apparatuses 31, 31 are disposed on both sides of the vehicle body assembling station 8c. There are also provided on the assembling line 8 a floor panel charging apparatus 32 which is movable back and forth between the floor panel transfer station 8a and the vehicle body assembling station 8c, and a roof panel charging apparatus 33 of suspension type which is movable back and forth between the roof panel transfer station 8b and the vehicle body assembling station 8c. The floor panel $W_1$ which has thus been assembled on the floor panel assembling line 7 is discharged by the transfer apparatus 20 from the reinforcing-welding station 7c to the floor panel transfer station 8a to place it on a lifter 35 which is provided in the station 8a. In that station 8a the floor panel $W_1$ is transferred to the floor panel charging apparatus 32 via the lifter 35. At the same time, in the transfer station 8b, the roof panel $W_3$, the dash board upper piece $W_4$ and the rear tray piece $W_5$ are transferred to the roof panel charging apparatus 33 by the transfer device 36 which is provided on one side of the roof panel transfer station 8b. The floor panel $W_1$ and the three-piece workpieces of the roof panel $W_3$, the dash board upper piece $W_4$ and the rear tray piece $W_5$ are transported by the respective charging apparatuses 32, 33 to the vehicle body assembling station 8c. The right and the left side panels $W_2$, $W_2$ are welded by the welding apparatuses 31, 31 to the floor panel $W_1$ and the three-piece workpieces to assemble the motorcar vehicle body W. The assembled vehicle body W is transferred by the transfer apparatus 37 for discharging to the reinforcing-welding stations 8e, 8f which are positioned ahead via the idling station 8d.

Each of the welding apparatuses 31 comprises, as shown in FIG. 14: a sliding base 31a which is provided on each side of the vehicle body assembling station 8c and is movable sideways to advance and retreat; a jig base 31c which is supported between a pair of front and rear supporting columns 31b, 31b on the slide base 31a so as to be reversible between an inward-looking posture and an outward-looking posture; and a welding jig 31d which is detachably mounted on the jig base 31c. In a condition in which the welding jigs 31d are reversed in the outward-looking posture, the side panels $W_2$ are set in position on the welding jigs 31d via presetting jigs 38a which are provided in presetting apparatuses 38 on an outside of the welding jigs 31d. They are then assembled to the floor panel $W_1$ and the three-piece workpieces by the reversing of the welding jigs 31d to the inward-looking posture. They are then welded together by welding guns 31e provided on the welding jigs 31.

The floor panel charging apparatus 32 travels along a rail frame 32a which is laid between the floor panel charging station 8a and the vehicle body assembling station 8c. The details thereof are as shown in FIGS. 16 through 19. It comprises: a travelling frame 32e having a pair of front and rear legs 32d, 32d which are engaged with a pair of rails 32b, 32b on the rail frame 32a via a plurality of rollers 32c; a sliding frame 32f which is supported by the travelling frame 32e so as to be movable back and forth; and a floor panel supporting frame 32g which is supported on the sliding frame 32f so as to be movable back and forth. There is mounted on the travelling frame 32e a hydraulic motor 32j which has on its output shaft a pinion 32i to be engaged with a rack 32h on the rail frame 32a. A vertical shaft 32l which is driven by the hydraulic motor 32j via a gear 32k is rotatably supported on the travelling frame 32e. A pinion 32n is provided on an upper end of the shaft 32l so as to be engaged with a rack 32m which is fixed to the sliding frame 32f. There is rotatably supported a pinion 32q on the sliding frame 32f such that it is pinched between racks 32o, 32p which are attached to the upper surface of the travelling frame 32e and the lower surface of the floor panel supporting frame 32g. When the hydraulic motor 32j is operated, the travelling frame 32e travels on the rail frame 32a by the rack 32h and the pinion 32i, and the sliding frame 32f moves relative to the travelling frame 32e by the rack 32m and the pinion 32n. At this time, the pinion 32q rotates trough the engagement with the rack 32o, so that the workpiece supporting frame 32g moves relative to the sliding frame 32f via the rack 32p. The workpiece supporting frame 32g is thus subjected to a high-speed reciprocating movement between the stations 8a, 8c.

When the floor panel charging apparatus 32 is retreated to the floor panel transfer station 8a, the lifter 35 is lowered to place the floor panel $W_1$ on the floor panel supporting frame 32g. Then, the floor panel charging apparatus 32 is advanced to the vehicle body assembling station 8c to charge the floor panel $W_1$ to the station 8c. When the discharging of the vehicle body W from the vehicle body assembling station 8c is delayed, the floor panel charging apparatus 32 is kept waiting in the roof panel transfer station 8b by using it as an idling station.

The roof panel charging apparatus 33 comprises: a guide frame 33a which is provided on the ceiling of the assembling line to extend over the roof panel transfer station 8b and the vehicle body assembling station 8c; a travelling frame 33b which is moved back and forth along the guide frame 33a between the stations 8b, 8c; and under the travelling frame 33b in a vertically movable manner, respectively, a pair of front and rear first setting jigs 33c, 33c for holding the roof panel $W_3$, a second setting jig 33d for holding the dash board upper piece $W_4$, and a third setting jig 33e for holding the rear tray piece $W_5$. After the travelling frame 33b is advanced to the vehicle body assembling station 8c, each of the setting jigs 33c, 33d, 33e is lowered to set each of the workpieces $W_3$, $W_4$, $W_5$ by inserting them from an upper portion between the side panels $W_2$, $W_2$ which are held by the welding jigs 31d, 31d.

Figure 20:
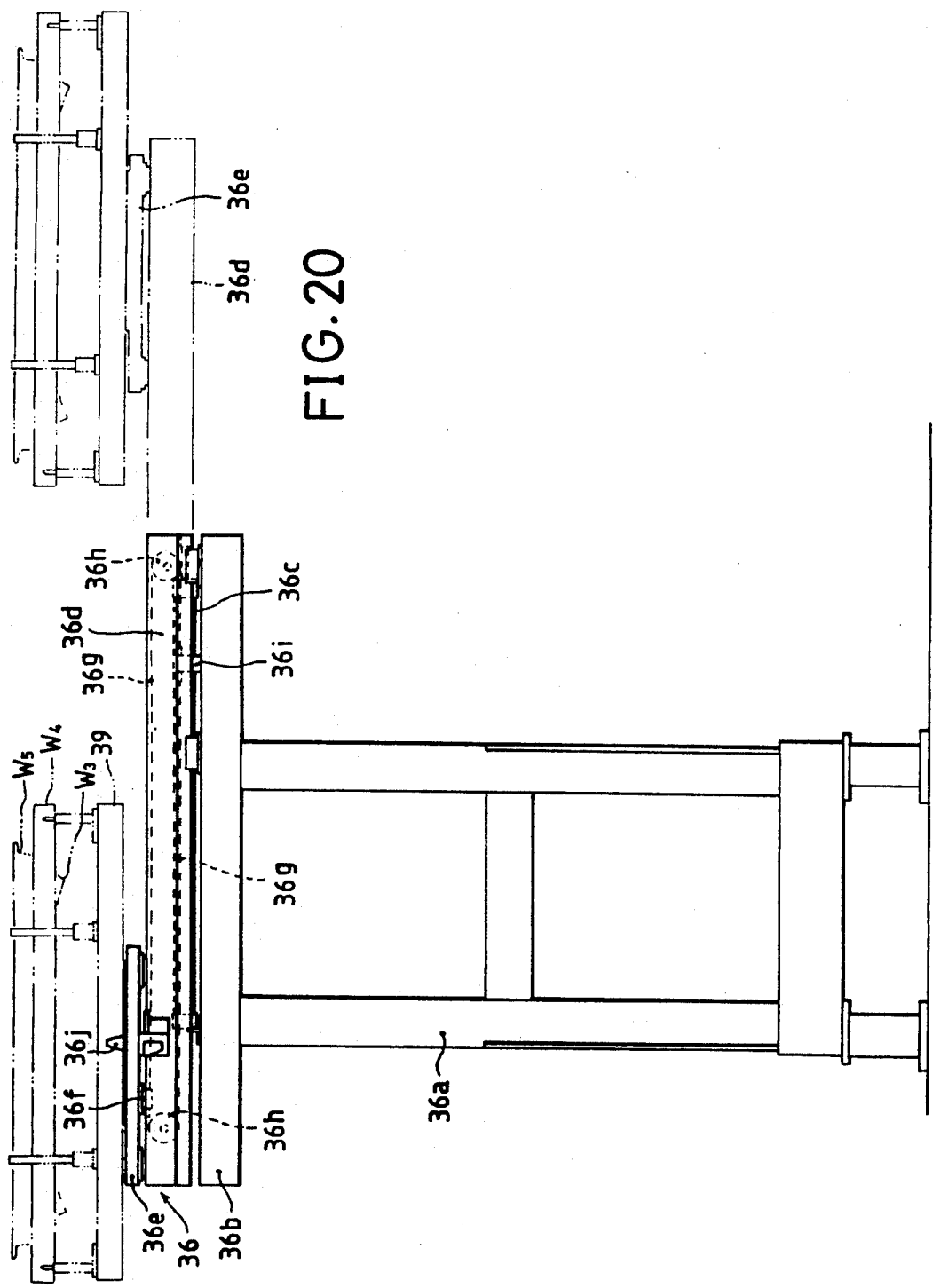
FIG. 20 is a front view of a transfer device taken along the line XX—XX in FIG. 13.
Figure 21:
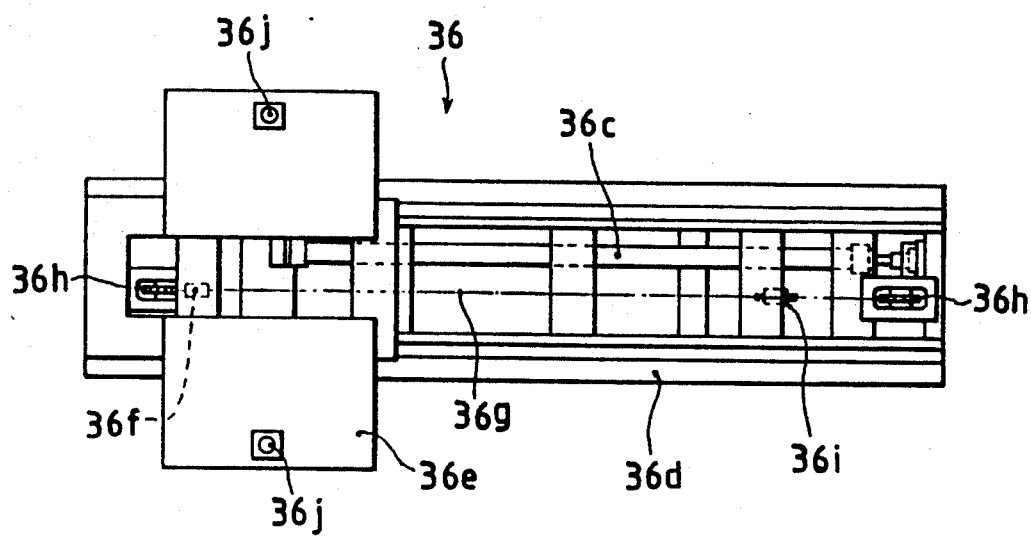
FIG. 21 is a plan view thereof.
Figure 22:
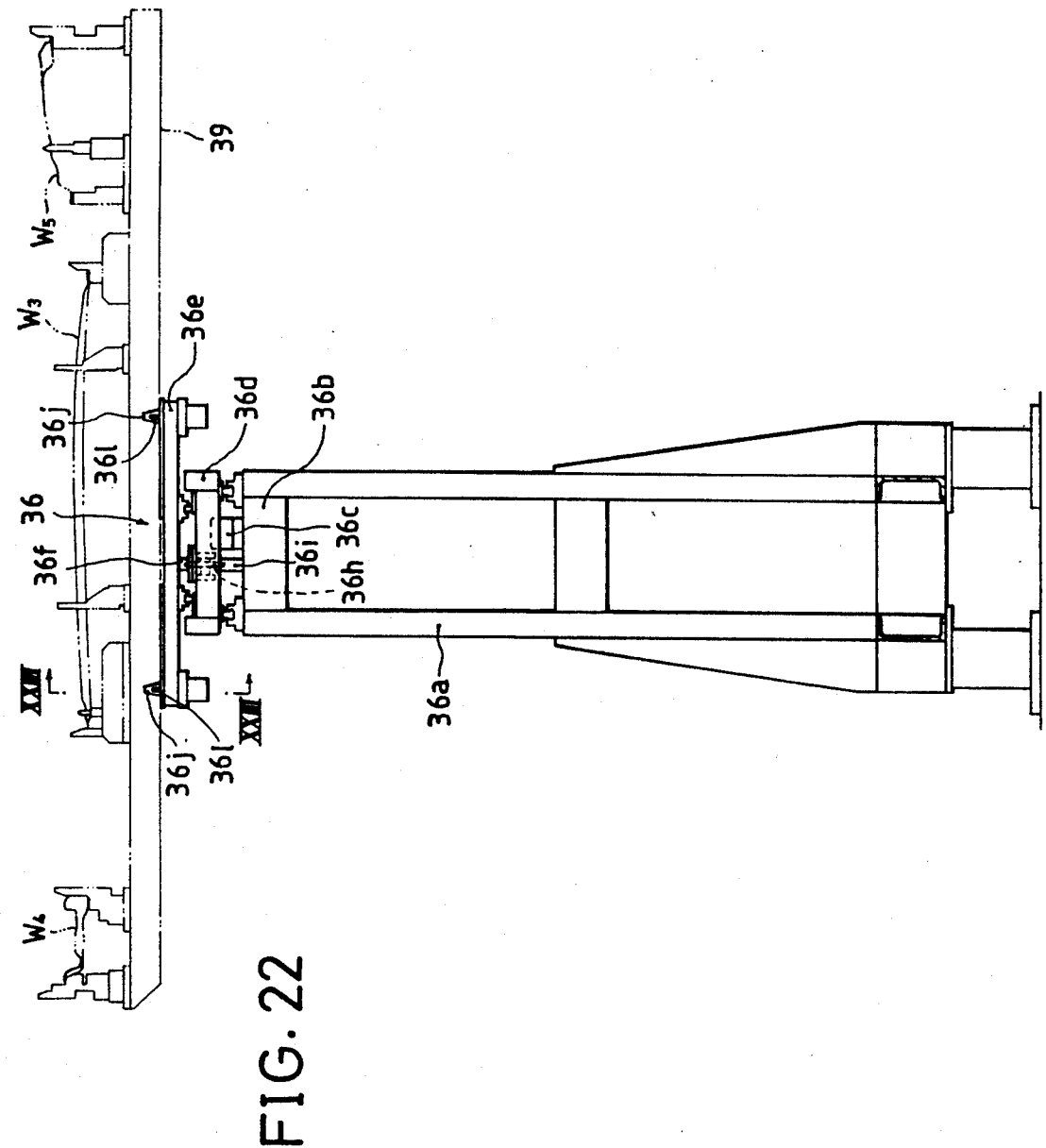
FIG. 22 is a right side view of FIG. 20.

The above-described transfer apparatus 36 is so arranged that the pallet 39 which has mounted thereon the three-piece workpieces $W_3$, $W_4$, $W_5$ in a predetermined positional relationship is advanced from a side into the transfer station 8b and that, at the time when the travelling frame 33b is retreated to the transfer station 8b, each of the workpieces $W_3$, $W_4$, $W_5$ on the pallet 39 is handed over to each of the setting jigs 33c, 33d, 33e. They are explained in more detail by referring to FIGS. 20 through 22. The transfer device 36 comprises: a base frame 36b which is mounted on an apparatus base 36a provided on a side of the roof panel transfer station 8b; a sliding frame 36d which is mounted on the base frame 36b and is movable sideways by a cylinder 36c; a receiving frame 36e which supports the pallet 39 and is supported on the sliding frame 36d so as to be slidable sideways; a pair of chains 36g, 36g one end of which is fixed to a fixing piece 36f on the lower surface of the receiving frame 36e to wound around each of sprockets 36h which are rotatably mounted on both ends of the sliding frame 36d and the other end of which is connected to a fixing piece 36i on the base frame 36b. It is thus so arranged that, accompanied by the forward and backward movements of the sliding frame 36d, the receiving frame 36e can be moved forward and backward between an advanced position inside the transfer station 8b and a retreated position outside thereof at a double speed.

Figure 24:
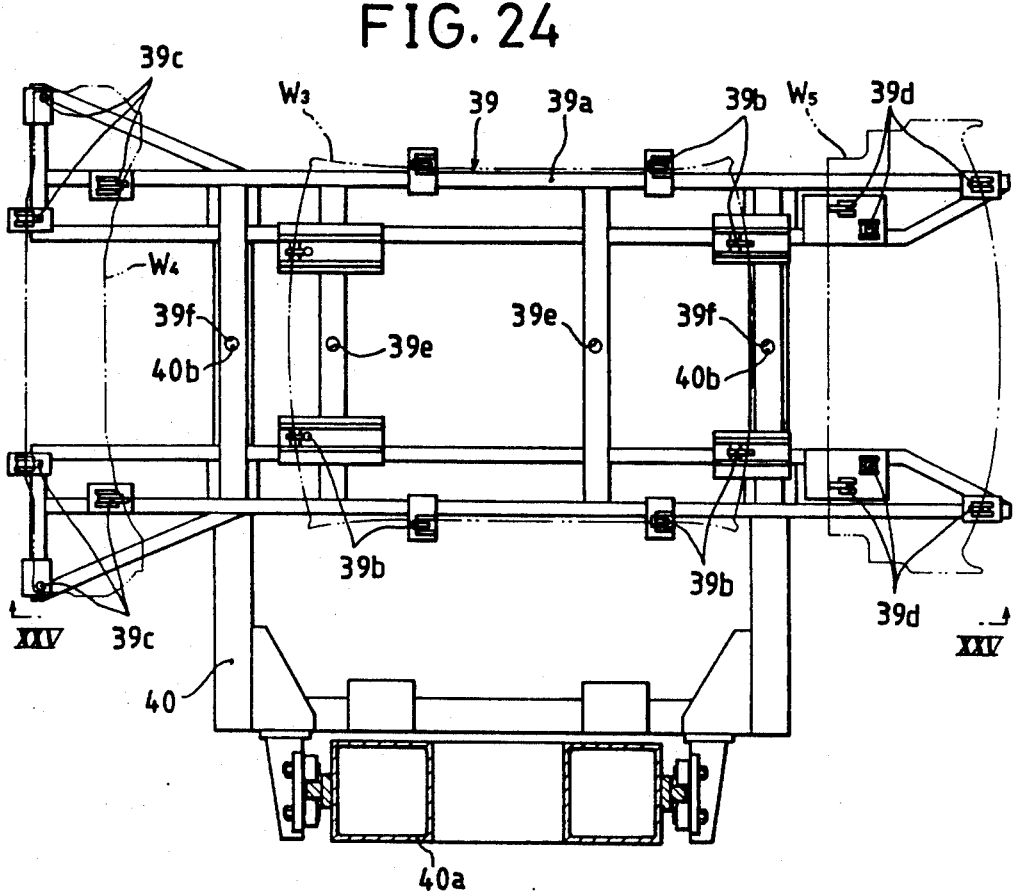
FIG. 24 is a plan view of a pallet.
Figure 25:
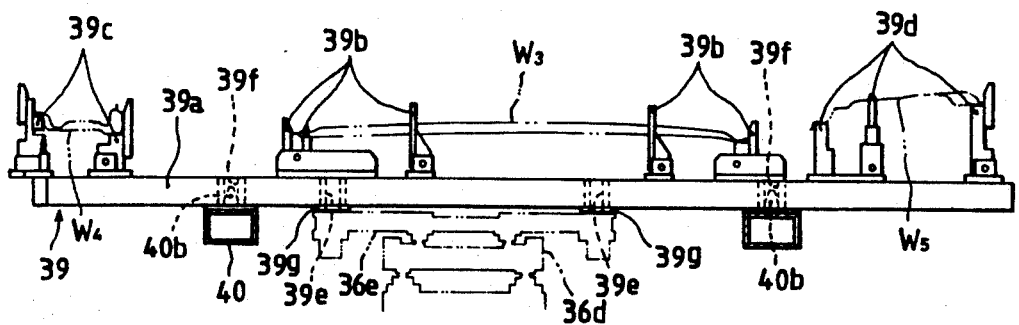
FIG. 25 is a sectional view taken along the line XXV—XXV in FIG. 24.

The pallet 39 comprises, as shown in FIGS. 24 and 25, a plurality of holding pieces 39b, 39c, 39d attached to a framed pallet main body 39a, respectively, for the roof panel $W_3$, the dash board upper piece $W_4$ and the rear tray piece $W_5$. The pallet 39 is lowered from the second-floor portion 2 by a drop lifter 40 which, as shown in FIG. 15, moves up and down along a supporting column 40a which is vertically provided on an outside of the transfer device 36, thereby placing the pallet 39 on the receiving frame 36e which is positioned in the retreated position. The receiving frame 36e and the drop lifter 40 have a pair each of vertically disposed locating pins 36j, 40b which are to be engaged with a pair each of pin holes 39e, 39f which are formed on the pallet 39 so that the pallet 39 can be placed on the receiving frame 36e and the drop lifter 40 in due positioning relationship.

Figure 23:
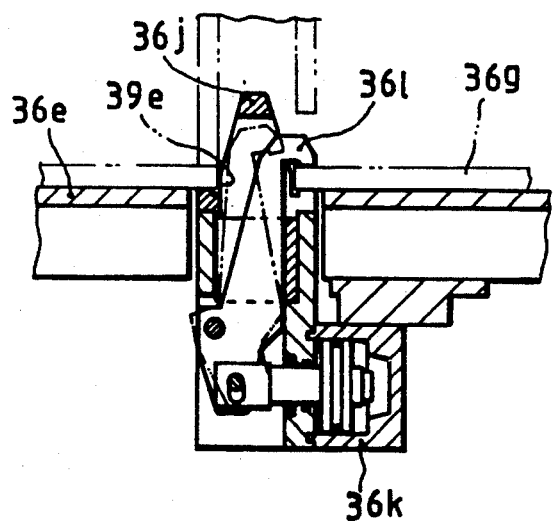
FIG. 23 is a sectional view taken along the line XXIII—XXIII in FIG. 22.

The locating pins 36j on the receiving frame 6e are so constructed as to include clamping claws 36l which are inclined by cylinders 36k, as shown in FIG. 23. It is so arranged that the clamping claws 36l can clamp that base plate 39g of the pallet 39 which has the pin holes 39e formed therein. The locating pins 40b on the drop lifter 40 are also constructed in the same manner.

On the floor of the second-floor portion 2, there is provided, as shown in FIGS. 2(b) and 15, a lifting opening 41 which is located above the position of the transfer device 36. There are provided on the second-floor 2 portion loading apparatuses 42, 43, 44 respectively for the roof panel $W_3$, the dash board upper piece $W_4$ and the rear tray piece $W_5$ such that they extend over the lifting opening 41. In a condition in which the pallet 39 is lifted by the drop lifter 40 to the second-floor portion 2 through the lifting opening 41, the roof panel $W_3$ is placed from an end of the roof panel working line 11 provided on the second-floor portion 2 to the pallet 39 via the loading apparatus 42. The dash board upper piece $W_4$ is similarly placed on the pallet 39 via a conveyor 12a which is positioned at an end portion of the working line 12 and the loading apparatus 43. On the other hand, since the rear tray piece $W_5$ is constructed in one piece and does not require a working line, it is manually set to a placing cart which is not illustrated and is placed on the pallet 33 via the loading apparatus 44.

In the drawings, numeral 45 denotes a stocking frame which is extended over an upper space of the ceiling of the vehicle body assembling line 8. A plurality of bases 46 to detachably hold thereon the welding jigs 31d, 31d are mounted on the stocking frame 45. The base 46 is lowered to the station 8c by a crane apparatus 47 which is provided above the stocking frame 45 through a lifting opening 45a which is provided in the ceiling of the vehicle body assembling station 8c. The welding jigs 31d, 31d are handed over between the base 46 and the welding apparatuses 31, 31 so that the jigs can be replaced with the change in the type of vehicle body. In order to prevent the base 46 from interfering with the guide frame 33a of the roof panel charging apparatus 33 at the time of its downward and upward movements, the guide frame 33a is made to be movable forward and backward so as to stand clear of the lifting opening 45a.

Next, the procedures of assembling the vehicle body W on the assembling line 8 are explained. First, the three-piece workpieces of the roof panel $W_3$, the dash board upper piece $W_4$ and the rear tray piece $W_5$ are set on the pallet 39 in a predetermined positional relationship by the loading apparatuses 42, 43, 44 on the second-floor portion 2. Then, the pallet 39 is lowered by the drop lifter 40 to transfer it to the receiving frame 36e of the transfer device 36 which is positioned in a retreated position. Thereafter, through the operation of the transfer device 36, the receiving frame 36e is advanced to an advanced position to advance the pallet 39 into the roof panel transfer station 8b. Each of the workpieces is handed over to each of the setting jigs 33c, 33d, 33e of the roof panel charging apparatus 33. In the floor panel transfer station 8a, the floor panel $W_1$ is handed over to the floor panel charging apparatus 32. The floor panel $W_1$ and the three-piece workpieces are transferred to the vehicle body assembling station 8c by the floor panel charging apparatus 32 and the roof panel charging apparatus 33, respectively. The side panels $W_2$, $W_2$ which are held by the welding jigs 31d, 31d of the welding apparatuses 31, 31 on both sides of the vehicle body assembling station 8c are welded to the floor panel $W_1$ from both sides. The three-piece workpieces are inserted and set in position from upwards into the space between the side panels $W_2$, $W_2$ to weld them together.

On the other hand, after handing over of the workpieces to the roof panel charging apparatus 33, the emptied pallet 39 is returned to one side of the roof panel transfer station 8b by the retreating movement of the receiving frame 36e. Then, the drop lifter 40 is lifted and the pallet 39 is lifted off the receiving frame 36e to the second-floor portion 2. In parallel with the welding work in the vehicle body assembling station 8c, the next three-piece workpieces are placed on the pallet 39 by the loading apparatuses 42, 43, 44. By repeating the above works, the assembling of the vehicle body W is carried out in succession.

The side panels $W_2$, $W_2$ on the right and left sides are lowered from the side panel working lines 13, 13 provided on the second-floor portion 2 to the right and left outside portions of the vehicle body assembling station 8c by drop lifters 49 (see FIG. 1) through a lifting opening 48 provided in the floor of the second-floor portion 2. These side panels $W_2$ are manually set to the presetting jigs 38a and are handed over to the welding jigs 31d via the presetting jigs 38a.

The vehicle body W which has been assembled in the vehicle body assembling station 8c is, as shown in FIGS. 1 and 2(a), transported to the discharging station 8g via the idling station 8d and the reinforcing-welding stations 8e, 8f, and is sent out from the discharging station 8g by a drop lifter 50 to an overhead transporting path 51 which leads to the reinforcing-welding line 4. Thereafter, the vehicle body W is charged to the reinforcing-welding line 4 via a drop lifter 52 at the starting end of the reinforcing-welding line 4. After reinforcing-welding each portion of the vehicle body in the reinforcing-welding line 4, the vehicle body W is discharged to an overhead transporting path 54 which leads to the post-step line 5 via a drop lifter 53 at the finishing end of the line 4 to charge it to the post-step line 5 via a drop lifter 55 at the starting end of the post-step line 5.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A system for assembling a motorcar vehicle body by combining a floor panel, side panels and a roof panel, said system comprising:
    a first-floor portion;
    a second-floor portion;
    said first-floor portion having a main working line provided with:
        a vehicle body assembling station having disposed on both sides thereof welding apparatuses with welding jigs on which the side panels can be set in position;
        a floor panel assembling line which is disposed on an upper-stream side of said vehicle body assembling station; and
        a floor panel parts working line which is disposed on a still further upper-stream side of said vehicle body assembling station for working partial floor panel constituting parts;
    said second-floor portion having another floor panel parts working line for working remaining floor panel constituting parts and a roof panel working line;
    means for charging the floor panel constituting parts worked in said floor panel parts working line disposed on said first-floor portion to the floor panel assembling line;
    means for lowering the floor panel constituting parts worked in said floor panel parts working line disposed on said second-floor portion from said second-floor portion to charge them to said floor panel assembling line so that these constituting parts are combined together in said floor panel assembling line to assemble the floor panel;
    means for charging the floor panel to said vehicle body assembling station; and
    means for lowering the roof panel worked in said roof panel working line from said second-floor portion to a neighborhood of said vehicle body assembling station and charging it to said vehicle body assembling station so that the side panels which are set to said welding jigs are combined in said vehicle body assembling station to the floor panel and the roof panel to assemble the motor car vehicle body.

2. A system for assembling a motorcar vehicle body according to claim 1, wherein said floor panel assembling line comprises a combining station for charging thereinto each of the constituting parts which constitute the floor panel by each transfer means, said combining station comprising: a setting jig for positioning and holding the constituting parts in a predetermined positional relationship; and welding robots which are provided on both sides of said combining station for welding the constituting parts on said setting jig.

3. A system for assembling a motorcar vehicle body according to claim 2, wherein:
    the floor constituting parts comprise a front component, a front floor and a rear floor;
    a direction of discharging the floor panel from said combining station is defined to be a front direction;
    among the front component and the rear floor, one to be combined to a rear portion of the front floor is defined to be rear-parts, and one to be combined to a front portion of the front floor is defined to be front-parts;
    a rear-parts working line for working said rear-parts is provided on said first-floor portion as said floor panel parts working line;
    a front floor working line for working said front floor and a front-parts working line for working said front-parts are provided on said second-floor portion as said another floor panel parts working line;
    rear-parts transporting means is provided for transporting the rear-parts from said rear-parts working line to a feeding position in the rear of said combining station;
    front floor transporting means and front-parts transporting means are respectively provided for lowering the front floor and the front-parts from said second floor portion to a feeding position above said combining station;
    said transfer means for the rear-parts being so arranged that the rear-parts transported to said rear feeding position are transferred forwards to set them on said setting jig; and
    each of said transfer means for said front floor and said transfer means for said front-parts being so arranged that the front floor and the front-parts transported to said upper feeding position are lowered to set them on said setting jigs with longitudinal positional alignment.

4. A system for assembling a motorcar vehicle body according to claim 3, wherein said upper feeding position is above a location of said welding robots on one side of said combining station; and each of said front floor transfer means and said front-parts transfer means comprises a lifting frame which is disposed on a supporting column so as to be movable up and down, said supporting column being vertically provided above the location of said welding robots on the other side of said combining station, a movable frame which is provided on said lifting frame so as to be shifted between an upper position of said combining station and one side thereof, and a transfer jig which is suspended from said movable frame for holding the front floor and the front-parts.

5. A system for assembling a motorcar vehicle body according to claim 4, wherein an exchanging station for exchanging said setting jig by withdrawing it from said combining station is provided between said combining station and said rear feeding position; and wherein said rear-parts transfer means comprises a travelling frame which moves back and forth between said rear feeding position and said combining station along a guide frame extended over an upper space of said exchanging station, and a transfer jig which holds the rear-parts and is suspended from said travelling frame so as to be movable up and down.

6. A system for assembling a motorcar vehicle body according to claim 1, wherein said second-floor portion further comprises: a working line for working interposing parts, such as a dash board upper piece or the like, which are to be interposed between the right and left side panels; and means for lowering the interposing parts together with the roof panel to a neighborhood of said vehicle body assembling station for charging them to said vehicle body assembling station.

7. A system for assembling a motorcar vehicle body according to claim 6, wherein said vehicle body assembling station further comprises a charging apparatus which charges the roof panel and the interposing parts from a transfer station disposed in the neighborhood thereof and is movable back and forth between said assembling station and said transfer station; said transfer station further comprises, on a side thereof, a transfer device which advances a pallet which can place thereon the roof panel and the interposing parts in a predetermined positional relationship, to said transfer station from a side direction to hand over the roof panel and the interposing parts on said pallet to said charging apparatus; a drop lifter which hands over said pallet to and from said transfer device is provided so as to be movable up and down between said second-floor portion and said transfer device; and said second-floor portion further comprises a loading apparatus which places the roof panel and the interposing parts on said pallet lifted by said drop lifter in a predetermined positional relationship.

8. A system for assembling a motorcar vehicle body according to claim 1, wherein said second-floor portion further comprises side panel working lines, and means for lowering the side panels worked in said working lines from said second-floor portion to set them to said welding jigs.

* * * * *